US010042358B2

(12) United States Patent
Sandbothe et al.

(10) Patent No.: US 10,042,358 B2
(45) Date of Patent: Aug. 7, 2018

(54) MOBILE APPLICATION FOR WHEELED JUVENILE PRODUCT

(71) Applicant: Thorley Industries LLC, Pittsburgh, PA (US)

(72) Inventors: Erica Sandbothe, Pittsburgh, PA (US); Kevin Dowling, Westford, MA (US); Mary J. Koes, Pittsburgh, PA (US); Suraj Joseph, Pittsburgh, PA (US); Mara McFadden, Pittsburgh, PA (US); John Walker, Pittsburgh, PA (US)

(73) Assignee: THORLEY INDUSTRIES LLC, Pittsburgh, PA (US)

( * ) Notice: Subject to any disclaimer, the term of this patent is extended or adjusted under 35 U.S.C. 154(b) by 0 days.

(21) Appl. No.: 15/130,256

(22) Filed: Apr. 15, 2016

(65) Prior Publication Data

US 2016/0327944 A1    Nov. 10, 2016

Related U.S. Application Data

(60) Provisional application No. 62/148,563, filed on Apr. 16, 2015.

(51) Int. Cl.
*G05D 1/00* (2006.01)
*A47D 9/02* (2006.01)
(Continued)

(52) U.S. Cl.
CPC ............. *G05D 1/0016* (2013.01); *A47D 9/02* (2013.01); *A47D 13/00* (2013.01); *A47D 13/10* (2013.01);
(Continued)

(58) Field of Classification Search
CPC ....... G05D 1/0016; G05D 19/02; H04W 4/20; H04W 4/005; B62B 5/004; B62B 9/00;
(Continued)

(56) References Cited

U.S. PATENT DOCUMENTS 8,193,650 B2 * 6/2012 Thorne .................. B62B 7/002
                                                             290/1 R
2010/0148582 A1   6/2010 Carter
                        (Continued)

FOREIGN PATENT DOCUMENTS

GB        2511915 A      9/2014

OTHER PUBLICATIONS

International Search Report and Written Opinion for PCT/US2016/027856 dated Jul. 22, 2016 (13 pages).

*Primary Examiner* — Mussa A Shaawat
*Assistant Examiner* — Michael V Kerrigan
(74) *Attorney, Agent, or Firm* — K&L Gates LLP

(57) ABSTRACT

A mobile application runs on a mobile computing device and allows a user thereof to interact with a wheeled juvenile product, such as a stroller. The juvenile product may have a generator for generating electricity from rotation of its wheels. Through the mobile app, the user can enter a preference for how that generated electricity is used, including how much is allocated to charge the juvenile product's battery that power electronic components of the juvenile product, versus how much is allocated to a charging station that charges external electronic devices. Additionally, the juvenile product can include a memory that stores data about trips with the juvenile product, including the date and time of the trip, the duration, and the distance. Upon a request issued from the mobile app, that data can be uploaded to the mobile app so that the user can view the trip data on the user's mobile computing device. That trip data can also be uploaded to a remote server.

22 Claims, 24 Drawing Sheets

(51) Int. Cl.
| | |
|---|---|
| *A47D 13/10* | (2006.01) |
| *B60N 2/28* | (2006.01) |
| *B60R 21/0134* | (2006.01) |
| *A47D 13/00* | (2006.01) |
| *G05D 19/02* | (2006.01) |
| *G08C 17/02* | (2006.01) |
| *B60N 2/26* | (2006.01) |
| *B60R 21/013* | (2006.01) |
| *B60R 21/207* | (2006.01) |
| *B60R 22/10* | (2006.01) |
| *B60L 1/14* | (2006.01) |
| *B60L 11/18* | (2006.01) |
| *B62B 5/00* | (2006.01) |
| *G05B 19/414* | (2006.01) |
| *G05F 1/66* | (2006.01) |
| *G06F 17/30* | (2006.01) |
| *H04W 4/20* | (2018.01) |
| *H04W 4/70* | (2018.01) |
| *B60R 21/01* | (2006.01) |
| *B62B 7/10* | (2006.01) |

(52) U.S. Cl.
CPC ............... *B60L 1/14* (2013.01); *B60L 11/18* (2013.01); *B60L 11/1824* (2013.01); *B60N 2/265* (2013.01); *B60N 2/286* (2013.01); *B60N 2/2812* (2013.01); *B60N 2/2821* (2013.01); *B60N 2/2851* (2013.01); *B60N 2/2863* (2013.01); *B60N 2/2875* (2013.01); *B60N 2/2884* (2013.01); *B60R 21/013* (2013.01); *B60R 21/0134* (2013.01); *B60R 21/2072* (2013.01); *B60R 22/105* (2013.01); *B62B 5/004* (2013.01); *G05B 19/414* (2013.01); *G05D 19/02* (2013.01); *G05F 1/66* (2013.01); *G06F 17/30241* (2013.01); *G08C 17/02* (2013.01); *H04W 4/20* (2013.01); *H04W 4/70* (2018.02); *B60L 2200/20* (2013.01); *B60N 2002/2815* (2013.01); *B60R 2021/01252* (2013.01); *B62B 7/10* (2013.01); *G05B 2219/23051* (2013.01); *G05B 2219/36168* (2013.01); *G05D 2201/0212* (2013.01)

(58) Field of Classification Search
CPC ..... G05F 1/66; G06F 17/30241; A47D 13/00; G08C 17/02; B60L 11/1824; B60L 11/18; B60L 1/14; G05B 19/414; B60N 2/265; B60N 2/2875; B60R 21/013; B60R 21/2072; B60R 22/105
See application file for complete search history.

(56) References Cited

U.S. PATENT DOCUMENTS

| | | |
|---|---|---|
| 2014/0358343 A1 | 12/2014 | Chastang, Jr. |
| 2016/0014252 A1* | 1/2016 | Biderman ............... B60L 15/20 455/420 |

* cited by examiner

| Stroller | App | Cloud | |
|---|---|---|---|
| | User: Jane | | |
| | First-Pair: 3/2 | | |
| | Sync Date: 3/4 | Trips | User-Trips |
| | | (3/1-A) | |
| 3/1 – Trip A | 3/1 – Trip A | | |
| 3/2 – Trip B | 3/2 – Trip B | (3/2-B) | Jane:B |
| 3/3 – Trip C | 3/3 – Trip C | (3/3-C) | Jane:C |
| 3/4 – Trip D | 3/4 – Trip D | (3/4-D) | Jane:D |

Figure 12F

| Stroller | App | Cloud | |
|---|---|---|---|
| | User: Kelly | | |
| | First-Pair: 3/5 | | |
| | Sync Date: 3/5 | Trips | User-Trips |
| 3/1 – Trip A | 3/5 – Trip E | (3/1-A) | |
| 3/2 – Trip B | | (3/2-B) | Jane:B |
| 3/3 – Trip C | | (3/3-C) | Jane:C |
| 3/4 – Trip D | | (3/4-D) | Jane:D |
| 3/5 – Trip E | | (3/5-E) | Kelly:E |

Figure 12H

| Stroller | App | Cloud | |
|---|---|---|---|
| | User: Kelly<br>First-Pair: 3/5<br>Sync Date: 3/5 | User: Larry<br>First-Pair: 3/6<br>Sync Date: 3/6 | |
| | | Trips | User-Trips |
| 3/1 – Trip A | 3/5 – Trip E | (3/1-A) | |
| 3/2 – Trip B | | (3/2-B) | Jane:B |
| 3/3 – Trip C | | (3/3-C) | Jane:C |
| 3/4 – Trip D | | (3/4-D) | Jane:D |
| 3/5 – Trip E | | (3/5-E) | Kelly:E |

Figure 12I

| Stroller | App | Cloud | |
|---|---|---|---|
| | User: Kelly<br>First-Pair: 3/5<br>Sync Date: 3/8 | User: Larry<br>First-Pair: 3/6<br>Sync Date: 3/6 | |
| | | Trips | User-Trips |
| 3/1 – Trip A | 3/5 – Trip E | (3/1-A) | |
| 3/2 – Trip B | 3/6 – Trip F | (3/2-B) | Jane:B |
| 3/3 – Trip C | 3/7 – Trip G | (3/3-C) | Jane:C |
| 3/4 – Trip D | | (3/4-D) | Jane:D |
| 3/5 – Trip E | | (3/5-E) | Kelly:E |
| 3/6 – Trip F | | (3/6-F) | Kelly:F |
| 3/7 – Trip G | | (3/7-G) | Kelly:G |

Figure 12J

| Stroller | App | | Cloud | |
|---|---|---|---|---|
| | User: Kelly<br>First-Pair: 3/5<br>Sync Date: 3/8 | User: Larry<br>First-Pair: 3/6<br>Sync Date: 3/8 | Trips | User-Trips |
| | | | (3/1-A) | |
| 3/1 – Trip A | 3/5 – Trip E | 3/6 – Trip F | (3/2-B) | Jane:B |
| 3/2 – Trip B | 3/6 – Trip F | 3/7 – Trip G | (3/3-C) | Jane:C |
| 3/3 – Trip C | 3/7 – Trip G | | (3/4-D) | Jane:D |
| 3/4 – Trip D | | | (3/5-E) | Kelly:E |
| 3/5 – Trip E | | | (3/6-F) | Kelly:F |
| 3/6 – Trip F | | | | Larry:F |
| 3/7 – Trip G | | | (3/7-G) | Kelly:G |
| | | | | Larry:G |

Figure 12K

| Stroller | App | | Cloud | |
|---|---|---|---|---|
| | User: Kelly<br>First-Pair: 3/5<br>Sync Date: 3/8 | User: Larry<br>First-Pair: 3/6<br>Sync Date: 3/8 | Trips | User-Trips |
| | | | (3/1-A) | |
| 3/1 – Trip A | 3/5 – Trip E | 3/6 – Trip F | (3/2-B) | Jane:B |
| 3/2 – Trip B | 3/6 – Trip F | 3/7 Trip G | (3/3-C) | Jane:C |
| 3/3 – Trip C | 3/7 – Trip G | | (3/4-D) | Jane:D |
| 3/4 – Trip D | | | (3/5-E) | Kelly:E |
| 3/5 – Trip E | | | (3/6-F) | Kelly:F |
| 3/6 – Trip F | | | | Larry:F |
| 3/7 – Trip G | | | (3/7-G) | Kelly:G |
| | | | | Larry:G |

Figure 12L

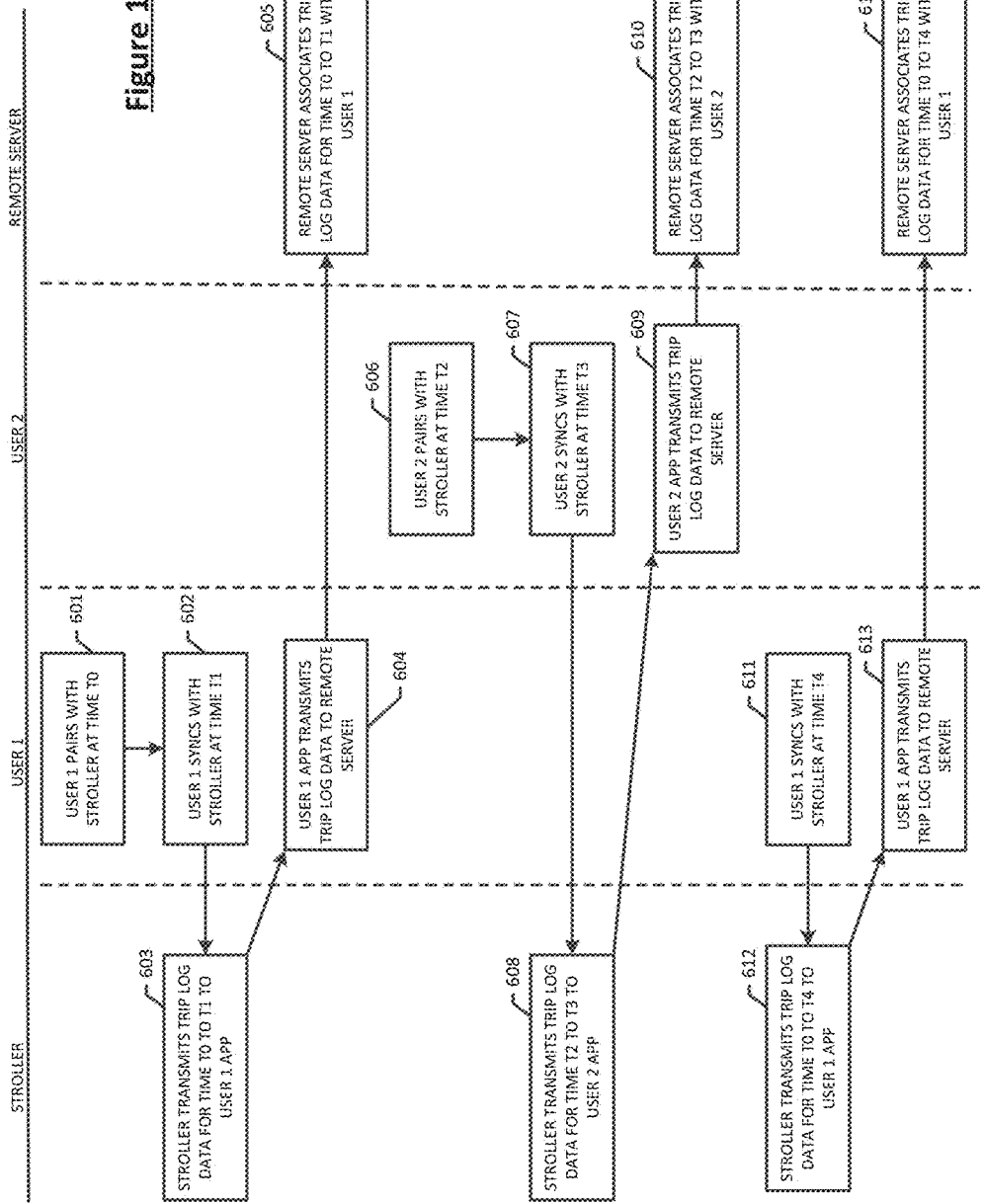

MOBILE APPLICATION FOR WHEELED JUVENILE PRODUCT

PRIORITY CLAIM

The present application claims priority to U.S. provisional application Ser. No. 62/148,563, filed Apr. 16, 2015, which is incorporated herein by reference in its entirety.

CROSS-REFERENCE TO RELATED APPLICATIONS

The present application is being filed concurrently with the following two, co-owned applications, wherein are both incorporated herein by reference in their entirety:

U.S. patent application Ser. No. 15/130,128, entitled USER-DEFINED STIMULATION PATTERNS FOR JUVENILE PRODUCTS; and U.S. patent application Ser. No. 15/130,135, entitled CHILD RESTRAINT SYSTEM.

BACKGROUND

Some modern baby strollers include electronic, battery-powered components, such as an electronic display, lights, or a motor for powering some functionality of the stroller. Some of these strollers also have generators on the wheels that charge a power storage device, such as a rechargeable battery (or batteries) of the stroller, where the battery powers the electronic components.

SUMMARY

In one general aspect, the present invention is directed to a mobile application (a "mobile app") for use with a wheeled juvenile product, such as a stroller. The mobile app, which runs on a mobile computing device, allows a user thereof to interact with the wheeled juvenile product in beneficial ways. As one example, the juvenile product may have a generator for generating electricity from motion of the juvenile product, such as rotation of its wheels. Through the mobile app, the user can enter a preference for how that generated electricity is to be used by the stroller, such as how much is allocated to charge the juvenile product's battery that powers electronic components of the juvenile product, versus how much is allocated to a charging station that charges external electronic devices—such as the user's mobile computing device—that are plugged into or otherwise coupled to the charging station.

In another example, the juvenile product includes a memory that stores updated, user-specific data about trips with the juvenile product, such as, for example, the date and time of the trips, their duration, and the distance. Upon a request issued from the mobile app, that user-specific trip data can be uploaded to the mobile app so that the user can view the trip data on the user's mobile computing device. That trip data can also be uploaded to a remote server so that the user can access it there too. Moreover, since multiple people may use the wheeled juvenile product over time, the data uploading process can be implemented so that it protects and differentiates user trip data from other users.

These and other benefits that are realizable through various embodiments of the present invention will be apparent from the description below.

FIGURES

Various embodiments of the present invention are described herein by way of example in connection with the following figures, wherein:

FIGS. 12A through 12L are diagrams illustrating a process for associating trip log data with a user of the wheeled juvenile product according to various embodiments of the present invention; and FIG. 13 is a diagram illustrating a process or associating trip log data with a user of the wheeled juvenile product according to various embodiments of the present invention.

DESCRIPTION

In one general aspect, the present invention is directed to the combination of a wheeled juvenile product, such as stroller, and mobile computing device, such as a smartphone or tablet computer, that executes a mobile application ("mobile app") that is linked to the wheeled juvenile product. A user of the mobile computing device/app can control various functionalities of the wheeled juvenile product from the mobile computing device/app. For example, the wheeled juvenile product can have generators on the wheels that generate electricity from rotation of the wheels, and the user of the mobile computing device/app can direct, from the mobile computing device/app, how the generated power is to be used. Alternatively or additionally, the mobile computing device/app can permit various users of the wheeled juvenile product to track their activity with the wheeled juvenile product (e.g., pushing or pulling it over distances). Before describing the various aspects of the mobile computing device/app and its interface with a wheeled juvenile product, an exemplary wheeled juvenile product—in particular a stroller—that can be used with various embodiments of the present invention is described.

Figure 1:
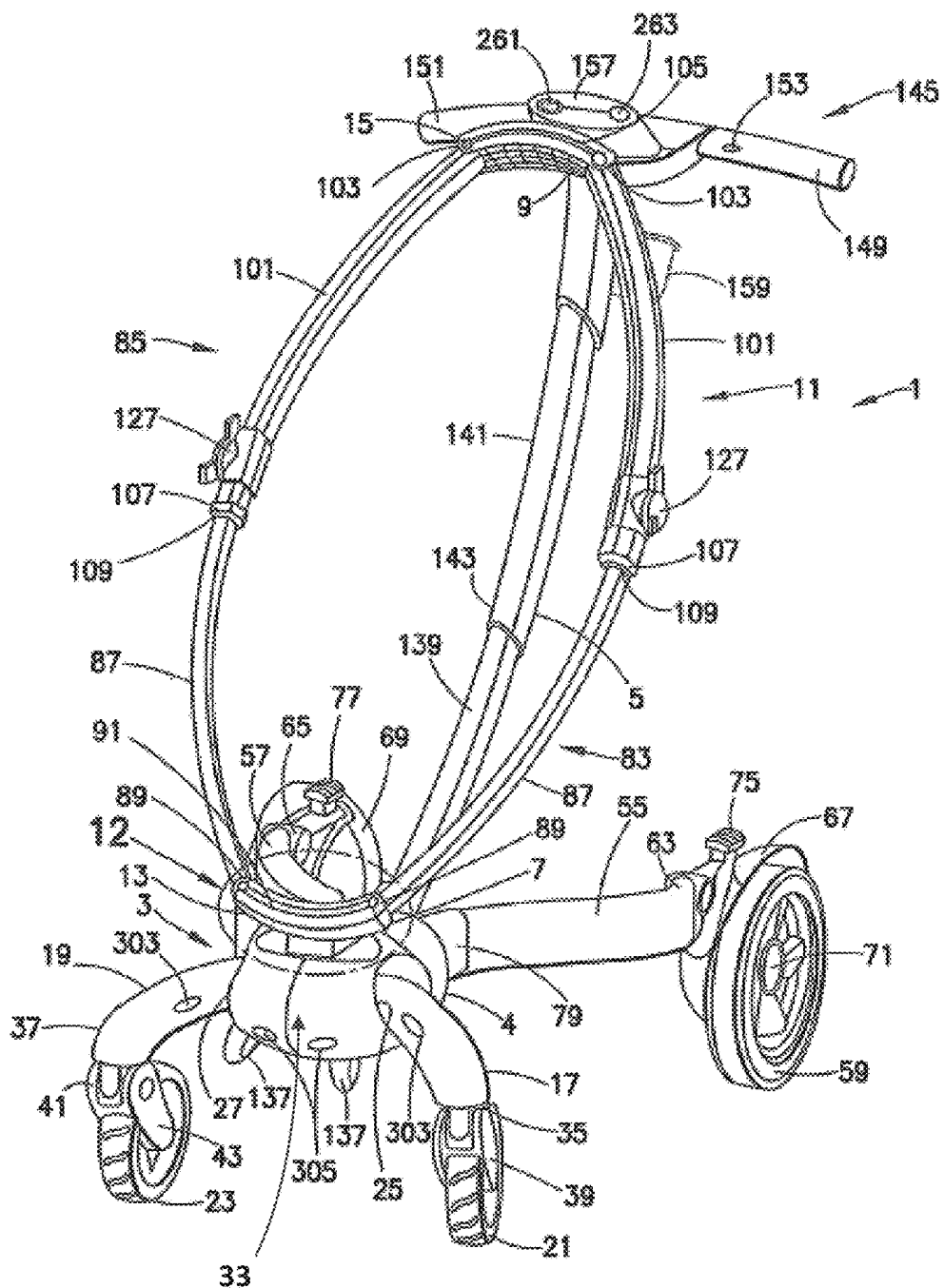
FIGS. 1 through 8 illustrate a wheeled juvenile product according to various embodiments of the present invention.

FIG. 1 shows a stroller 1 that includes: a hub 3; a support structure 5 having a first end 7 coupled to hub 3 and a second end 9; a seating portion 11 having a bottom portion 13 coupled to a top portion of hub 3; and a top portion 15 coupled to second end 9 of support structure 5. The stroller 1 can be collapsible in the length, width, and height directions for storage and transportation, and expand in the length, width, and height directions for use.

The illustrated stroller 1 further includes a first front leg 17 and a second leg 19 both rotationally coupled to hub 3. A first front wheel 21 is rotationally coupled to and supported by first front leg 17 and a second front wheel 23 is rotationally coupled to and supported by second front leg 19. A proximal end 25, 27 of each front leg 17, 19 includes a post 29, 31 that is rotatably engaged within a housing 33 of hub 3. Posts 29, 31 are mechanically coupled, thereby enabling rotational movement of each front leg 17, 19 about housing 33 between an open position and a collapsed position.

Figure 2:
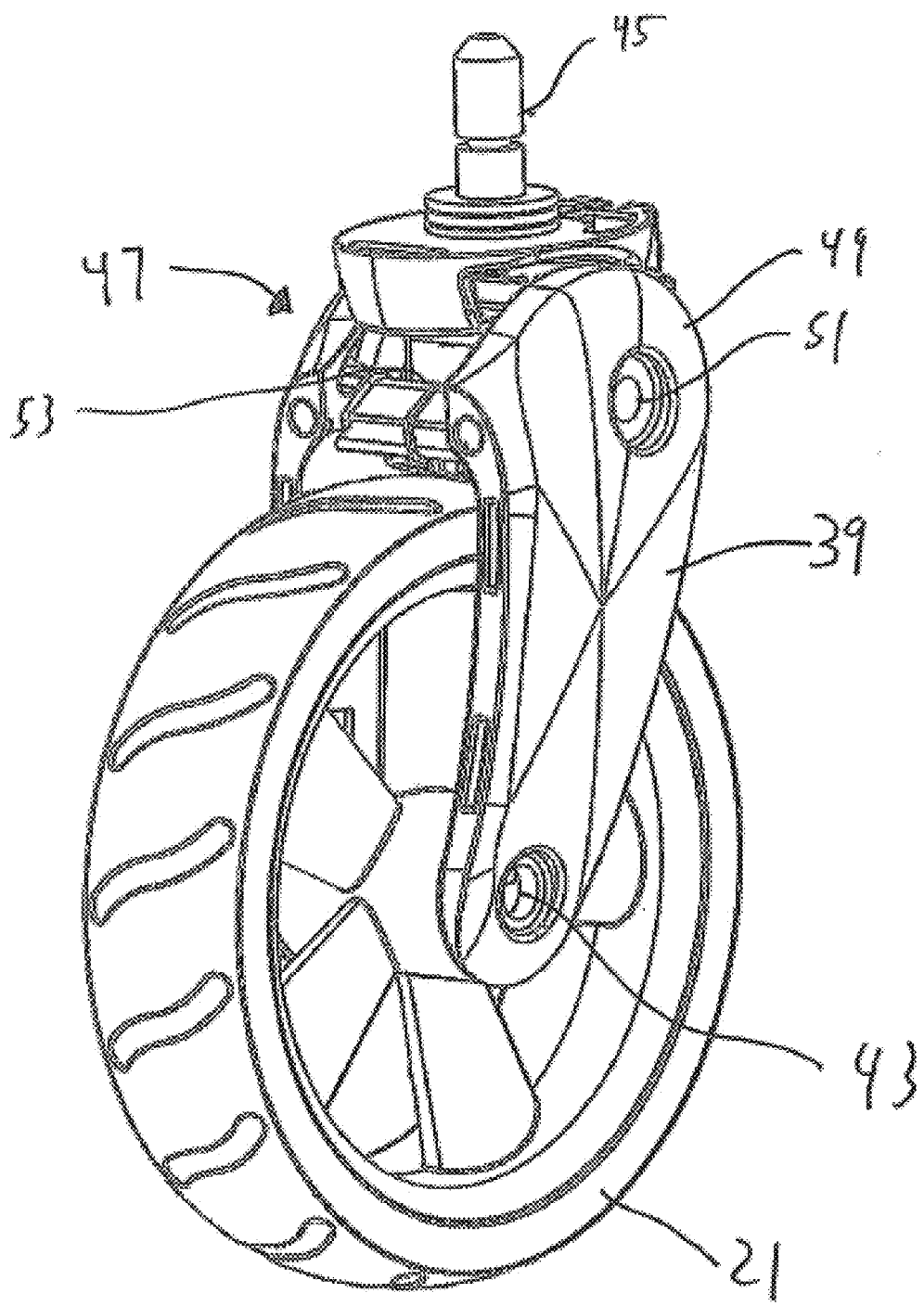

Pivotally connected to distal end 35, 37 of each front leg 17, 19 can be a pair of generally U-shaped wheel receiving members 39, 41, an example of which (element 39) is shown in FIG. 2. Both generally U-shaped wheel receiving members 39, 41 preferably being identical. The generally U-shaped wheel receiving members 39, 41 receive respective front wheels 21, 23. Each wheel receiving member 39, 41 comprises an axle 43 to allow the front wheels 21, 23 to roll about their respective axles 43. Wheel receiving members 39, 41 are pivotally connected via a post 45 or any other suitable fastening mechanism to the distal ends 35, 37 of front legs 17, 19 to allow the front wheels 21, 23 to pivot about respective axes substantially perpendicular to their axles 43 to accommodate changes in the rolling direction of the front of stroller 1.

A suspension module 47 may be disposed between each wheel receiving member 39, 41 and distal end 35, 37 of each front leg 17, 19. While any of a number of suspension mechanisms well-known to those skilled in the art may be used, such as compression springs or the like, the preferred suspension module 47 also ensures the wheel receiving members 39, 41 avoid being trapped or stuck when stroller 1 is automatically folded as described in greater detail hereinafter. To accomplish this, suspension module 47 is rotatably attached to an upper, front portion 49 of wheel receiving member 39, 41 by a pin 51. A torsion spring 53 is provided to bias suspension module 47 against wheel receiving member 39, 41 during normal operation. Pin 51 is placed in an upper, front portion 49 of wheel receiving member 39, 41 so that normal use of the stroller will not cause suspension module 47 to pull away from wheel receiving member 39, 41.

Referring again to FIG. 1, the stroller 1 may further include a first rear leg 55 and a second rear leg 57 that are both rotationally coupled to hub 3. In addition, first rear leg 55 and second rear leg 57 are mechanically coupled to each other and to first front leg 17 and second front leg 19 as will be described in greater detail hereinafter. Each rear leg 55, 57 has a long cross-sectional dimension and a short cross-sectional dimension. In addition, each rear leg 55, 57 is configured to rotationally support a rear wheel 59, 61 at a distal end 63, 65 thereof within a respective rear wheel housing 67, 69. More specifically, the respective axles 71, 73 of rear wheels 59, 61 are received in the respective rear wheel housings 67, 69 to allow the rear wheels 59, 61 to roll about their respective axles 71, 73. Each rear wheel housing 67, 69 houses a braking mechanism, operated by either or both of brake pedals 75, 77 for selectively locking rear wheels 59, 61 to prevent inadvertent rolling movement of stroller 1 when the braking mechanism is locked. In addition, each rear wheel housing 67, 69 also houses a power generating device operationally coupled to the respective axle 71, 73 of rear wheels 59, 61. The power generating device is provided to recharge an onboard power supply, which provides power to an actuation device that allows the stroller to collapse and expand automatically. The power supply also provides power to additional accessories and onboard electronic systems of the stroller 1.

Figure 3:
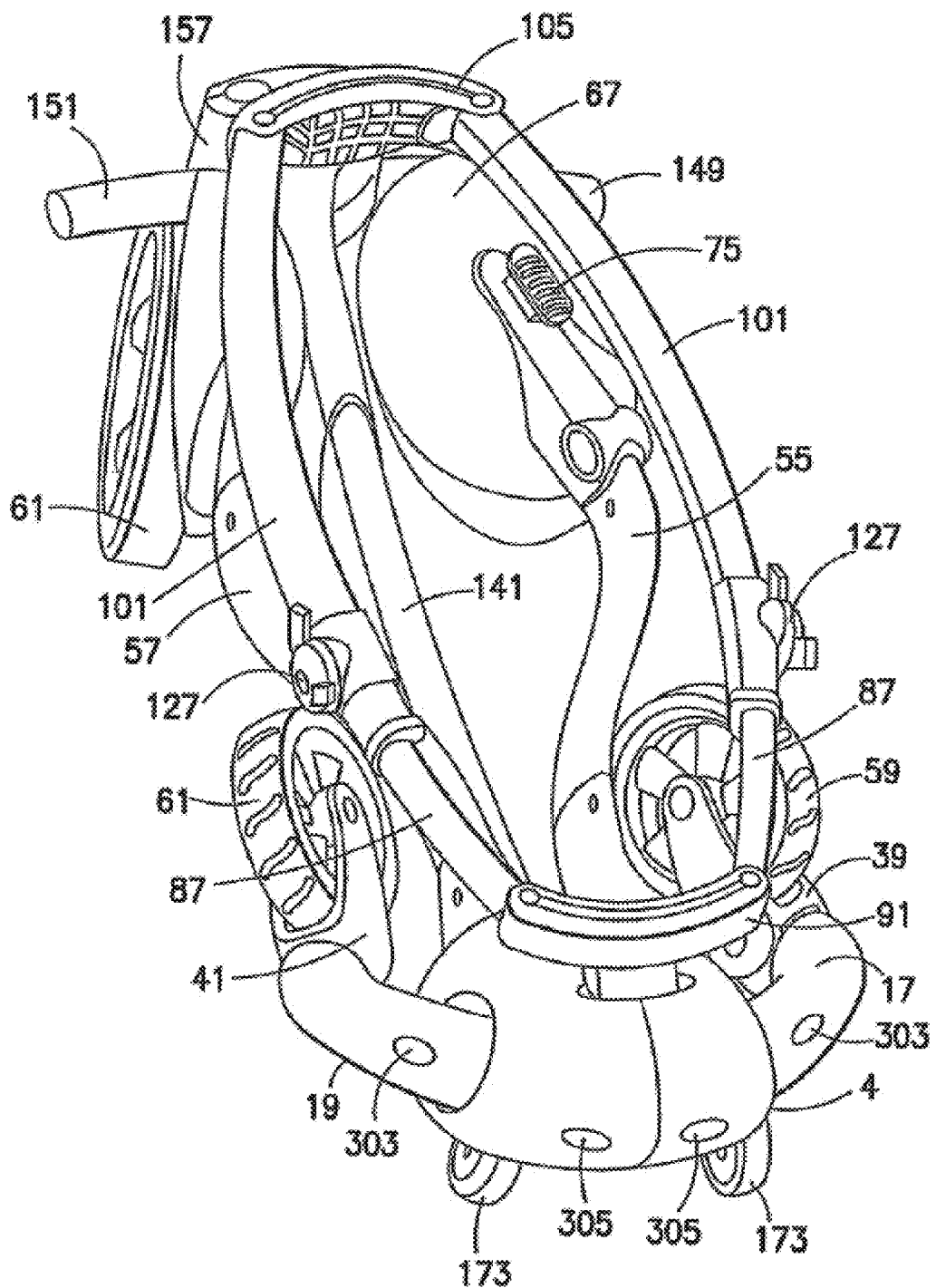

A proximal end 79, 81 of each rear leg 55, 57 is rotationally coupled to hub 3 for enabling rotational movement of the rear legs 55, 57 such that the rear legs 55, 57 are movable between an open position, as generally shown in FIG. 1, and a collapsed position, as generally shown in FIG. 3. Rear legs 55, 57, in cross-section, have a long dimension and a short dimension. A plane bisecting the long dimension of a portion of rear legs 55, 57 near distal ends 63, 65 thereof is canted in the range of 12 to 25 degrees, preferably 19 degrees, in relation to a plane bisecting the long dimension of a portion of rear legs 55, 57 near proximal ends 79, 81. This cant results in a narrower footprint when rear legs 55, 57 are in their collapsed position than when they are in their open position. By way of further illustration, as rear legs 55, 57 are collapsed, the rear wheels 59, 61 move closer to each other to provide a more compact folded stroller 1.

Referring now to seating portion 11 of stroller 1, the seating portion 11 includes a generally U-shaped lower seat frame assembly 83 and a generally U-shaped upper seat frame assembly 85. Lower seat frame assembly 83 and upper seat frame assembly 85 are coupled together giving seating portion 11 a generally elliptical-shaped appearance as shown in FIG. 1. Lower seat frame assembly 83 includes two lower arcuate seat frame components 87, each having the same radius, pivotally connected at a first end 89 to a seat frame mounting member 91 to allow each of lower arcuate seat frame components 87 to pivot or rotate relative to seat frame mounting member 91. In various embodiments, the seat frame mounting member 91 is detachably and rotatably disposed on a mounting bracket that is fixably attached to housing 33 of hub 3. In one embodiment, the mounting bracket has a spring-biased portion such that, when in use, the weight of an infant or child will cause seat frame mounting member 91 to push down on spring-biased portion and, in turn, cause a bottom surface of the spring-biased portion to trigger a weight sensor. The weight sensor, or other sensor(s) designed to detect the presence of an infant or child in stroller 1, is operatively connected to a control system to disable accidental actuation of the drive system that causes stroller 1 to collapse.

The upper seat frame assembly 85 is comprised of two upper arcuate seat frame components 101, each preferably having the same arc radius. The arc radius of each of upper arcuate seat frame components 101 may be the same as the arc radius of lower arcuate seat frame components 87. Upper arcuate seat frame components 101 are pivotably connected at their first ends 103 to an upper seat frame mounting member 105 to allow each of the upper arcuate seat frame components 101 to pivot or rotate relative to the upper seat frame mounting member 105. Each upper arcuate seat frame component 101 is slidingly mated, at a second end 107, to a second end 109 of its corresponding lower arcuate seat frame component 87, such that upon collapsing stroller 1, each lower arcuate seat frame component 87 will be slidingly received into its corresponding upper arcuate seat frame component 101. In an alternative embodiment, each upper arcuate seat frame component 101 may be slidingly received within its corresponding lower arcuate seat frame component 87. This arrangement of lower arcuate seat frame components 87 and upper arcuate seat frame components 101 allows the overall width of the generally U-shaped upper and lower arcuate seat frame assemblies 83, 85 to decrease (consistent with the decrease in the lateral width of the wheels) as they move from their open position as to their collapsed position.

Accordingly, it will be appreciated that stroller 1 provides a seating portion 11, a support structure 5, a pair of front legs 17, 19, and a pair of rear legs 55, 57 that define a linkage having a single degree of freedom, such that movement of any one of the seating portion 11, the support structure 5, the pair of front legs 17, 19, and the pair of rear legs 55, 57 relative to one another toward their collapsed or open positions may cause movement of the others toward their collapsed or open positions.

Figure 4:
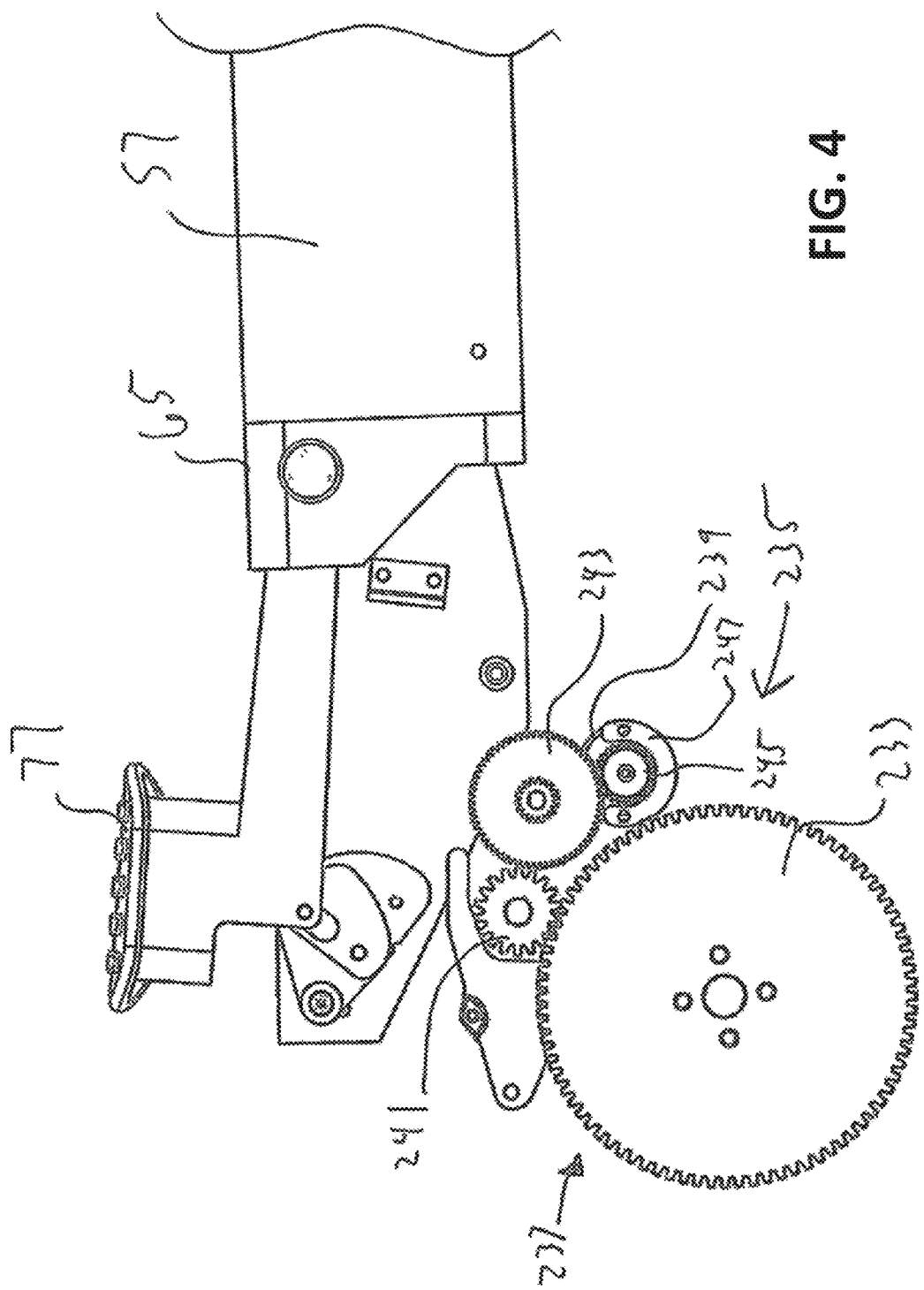
Figure 5:
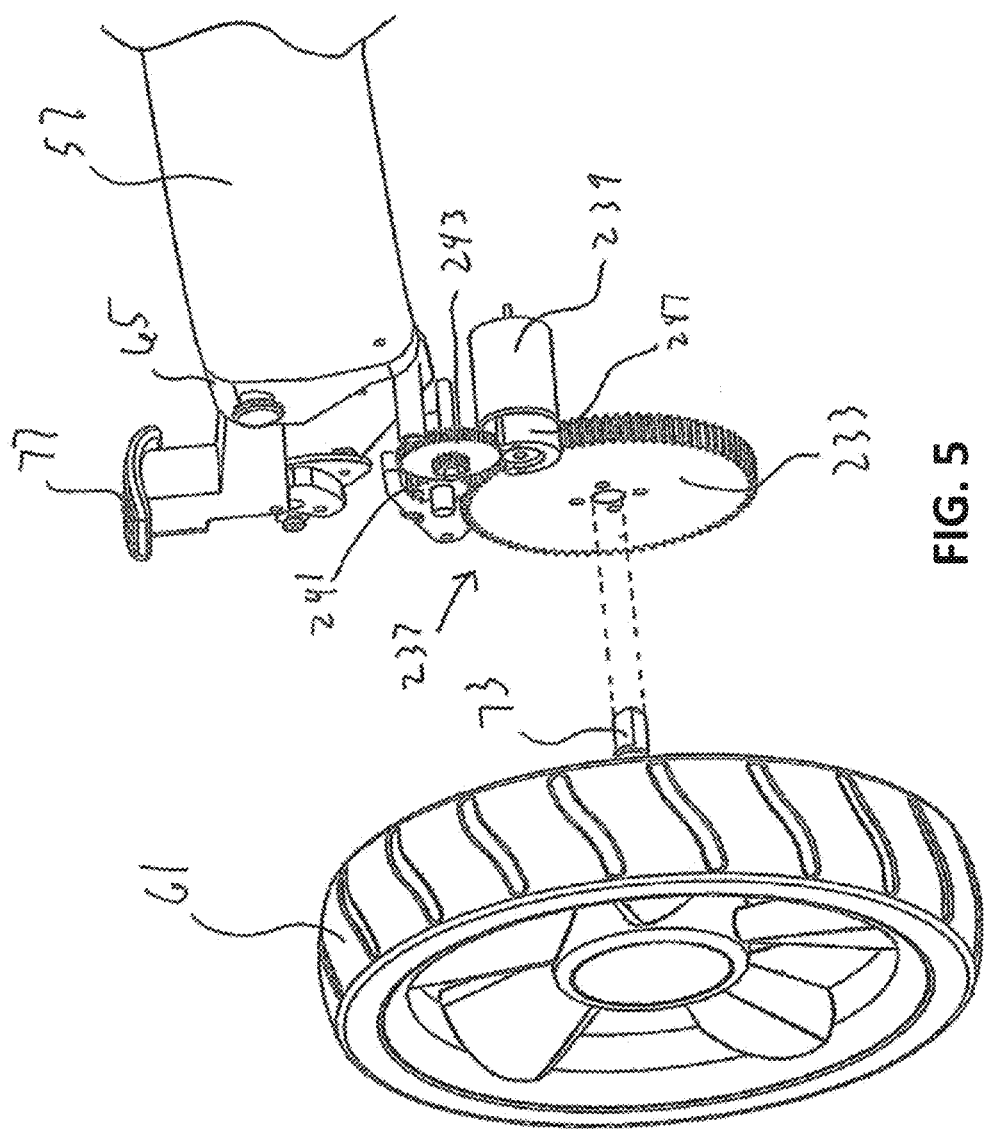

In various embodiments, the stroller 1 includes a dual generator system that is driven by the turning and rotation of the stroller wheels. As shown in the exemplary embodiment of FIGS. 4 and 5, the dual generator system preferably includes identical generator systems 235 positioned in each of the rear wheel housings 67, 69. Since these generator systems are preferably identical, only one of these generator systems 235 will be described hereinafter. The generator system 235 includes a gear reduction system 237 operationally coupled between axle 73 of second rear wheel 61 and a generator 239. Gear reduction system 237 includes a plurality of gears, such as gear 233 which is driven by axle 73 as second rear wheel 61 rolls, second gear 241 driven by gear 233, third gear 243 driven by second gear 241, and fourth gear 245 driven by third gear 243. Fourth gear 245 is coupled to a drive shaft of generator 239 such that rotation of fourth gear 245 causes generator 239 to produce electricity. A rubber bushing 247 may be provided to surround all or part of generator 239 for noise reduction. Generator 239 may be embodied as an electric motor. Gear reduction system 237 is desired because coupling a rear wheel 59, 61 directly to the motor used as generator 239 to recharge a battery is impractical since it would require a large velocity on the wheel in order to achieve the roughly 3,000 revolutions per minute or 50 revolutions per second for which such motors are typically optimized.

In various embodiments, the stroller 1 includes a lighting system 257 to enhance safety. The lighting system can include two lighting subsystems that provide: a) constant lighting for safety purposes such that the stroller can always be seen; and b) pathway lighting so that irregularities in the path of travel of stroller 1 can be seen. As shown in FIG. 1, the constant lighting subsystem includes a daytime running light 303 positioned on first front leg 17 and a daytime running light 303 positioned on second front leg 19. The daytime running lights 303 are positioned on front legs 17, 19 such that the light produced thereby is visible from 360 degrees around stroller 1. The pathway lighting subsystem includes a pair of path lights 305 located underneath hub 3 and positioned to point forward. Accordingly, the path lights 305 cast light and illuminate surface irregularity in a path in front of stroller 1. Desirably, path lights 305 are located on hub 3 at a position that is within about 10 inches of pathway.

Figure 6:
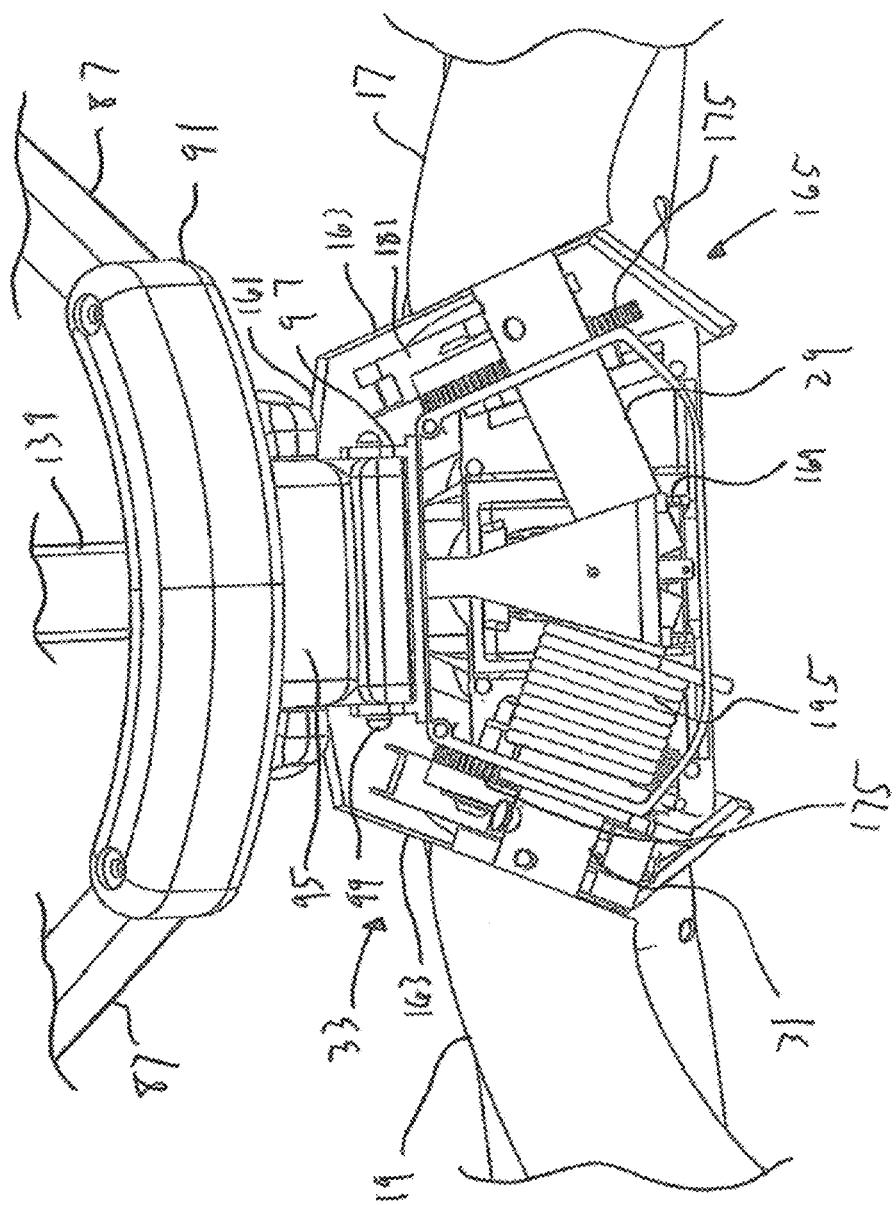

As shown in FIG. 6, the housing 33 may include a drive mechanism 165 mounted thereon which powers stroller 1 to be moved back and forth between its open and collapsed positions. More specifically, the drive mechanism 165 may be configured to mechanically link and simultaneously drive gears 175 of right and left coupling systems 171, thereby causing legs 17, 19, 55, 57 to synchronously expand or collapse. Drive mechanism 165 is further configured to cause the support structure 5 to expand or collapse.

Figure 7:
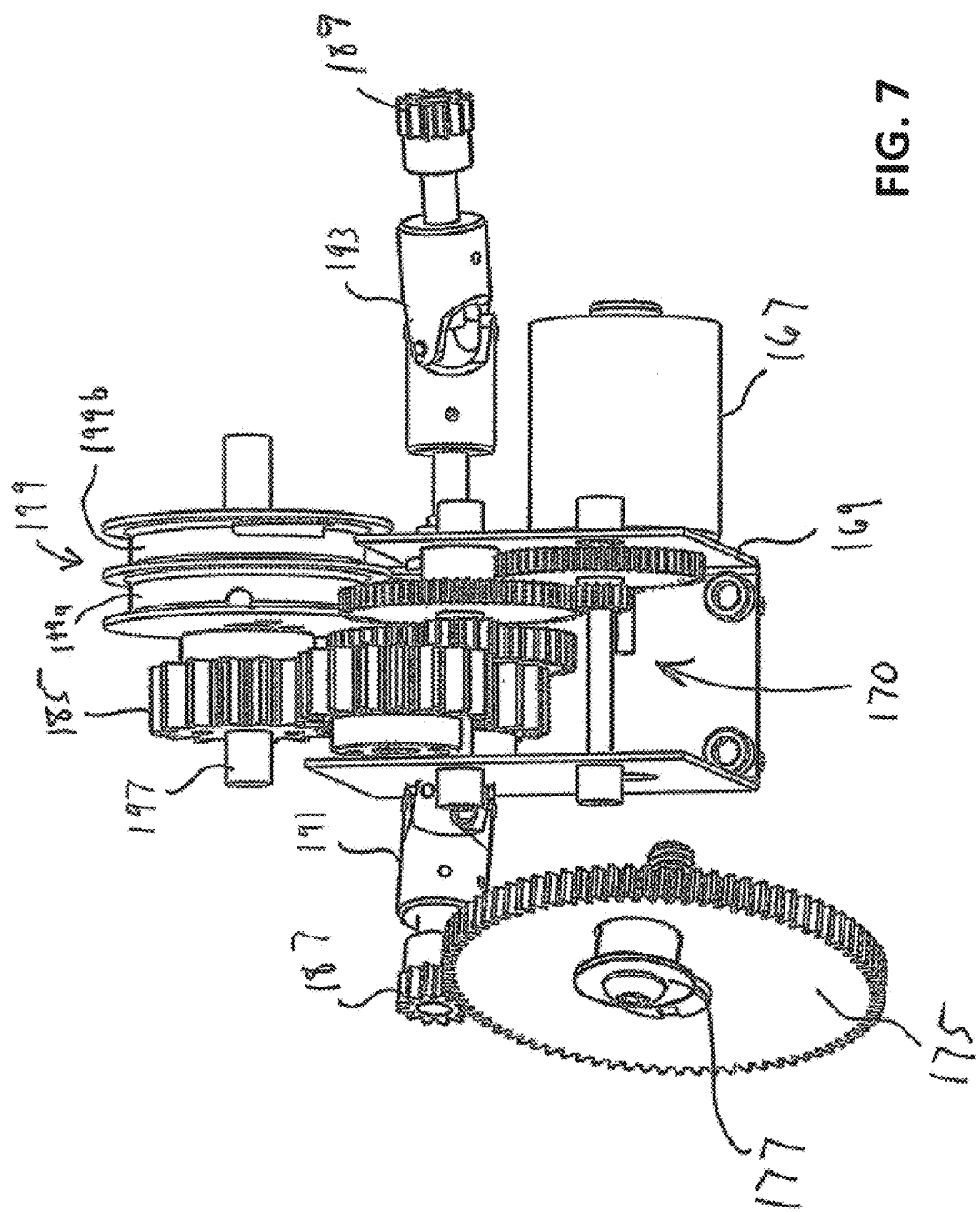

In one embodiment, the drive mechanism 165 includes a motor 167 mounted in a fixed position on an inner casing 169 of housing 33, and a gear train 170 positioned within inner casing 169 and having a first gear driven by a drive shaft of motor 167, as shown in FIG. 7. Gear train 170 is configured to allow a single motor (i.e., motor 167) to drive rotational drive spool gear 185 and first and second drive gears 187, 189. Motor 167 may be of a reversible type, or alternatively, a single-direction motor with mechanical reversing means.

Figure 8:
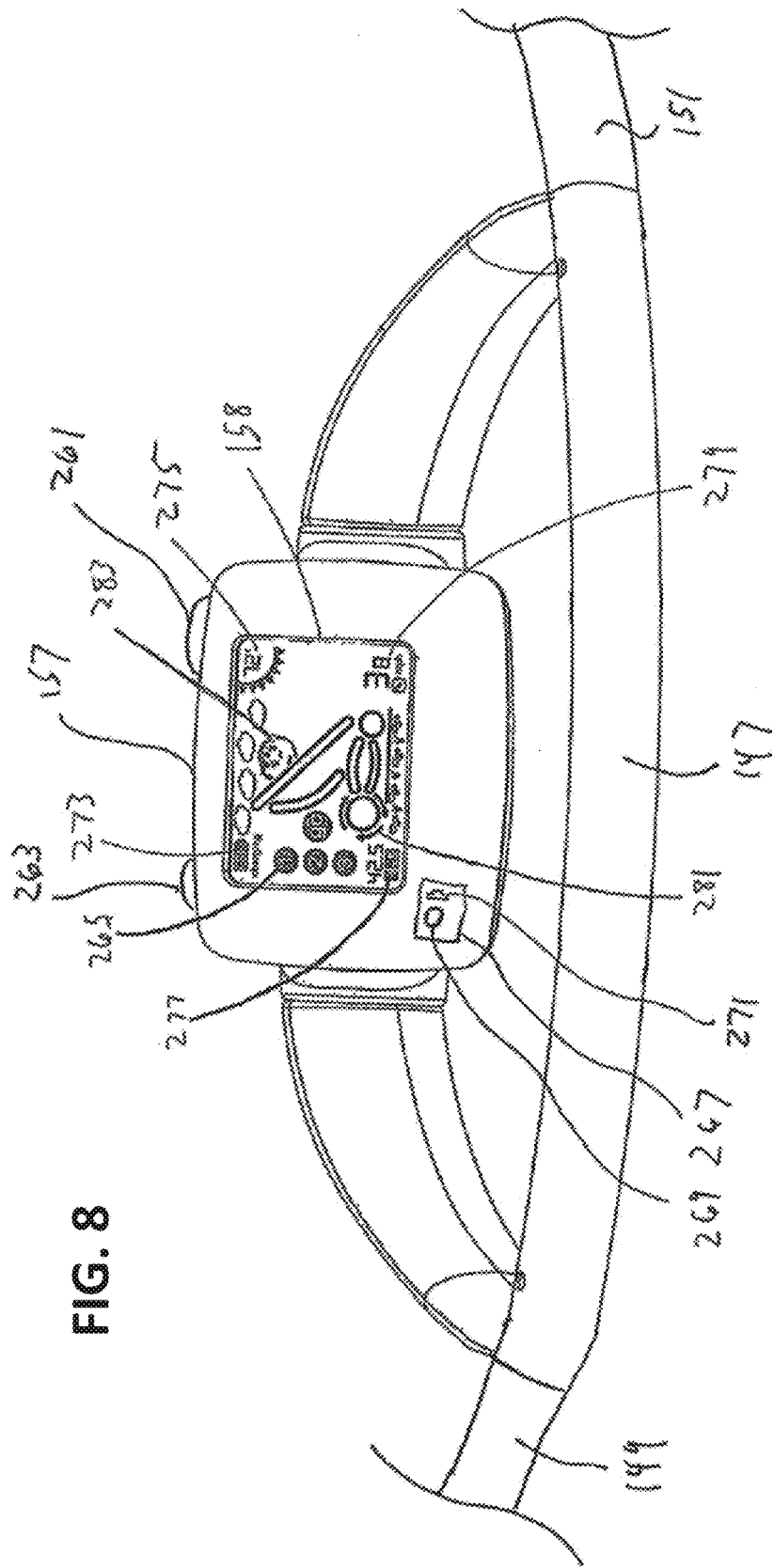

The stroller 1 may also comprise a user interface console 157, as shown in the example of FIG. 8. As shown in this diagram, the user interface console 157 may comprise a control switch 261, which may be an integral portion of handlebar assembly 145 or detachable therefrom, for causing actuation of a drive mechanism 165. Control switch 261 is operatively connected to motor 167 through a control circuit 411 (see FIG. 9) to control actuation of motor 167, which in turn controls drive mechanism 165, which in turn controls movement of the front legs 17, 19, rear legs 55, 57, and support structure 5 between their collapsed and open positions as discussed in detail hereinabove. Desirably, the wires extending between the control switch 261, the control circuit 411, and motor 167 are all disposed internally of the stroller elements, such as extending internally within hollow tubular members. The control switch 261, or a separate control switch and/or a common controller, may also be operatively coupled to one or more latch mechanisms to move the latch mechanisms from their latched positions in which they prevent the stroller from moving from its fully-open position toward its collapsed position, to their unlatched positions in which they allow the stroller to move from its fully-open position towards its collapsed position. Motor 167, or a separate drive mechanism, may be operatively connected to a control switch and/or controller to affect automatic movement of the latches upon actuation by control switch 261. The unlatching of the one or more latches is preferably carried out prior to, or simultaneous with, the initiation actuation of motor 167.

More details about an exemplary stroller that can be used with various embodiments of the present invention are provided in United States published patent application Pub. No. 2010/0045146, which is incorporated herein by reference in its entirety.

Figure 9:
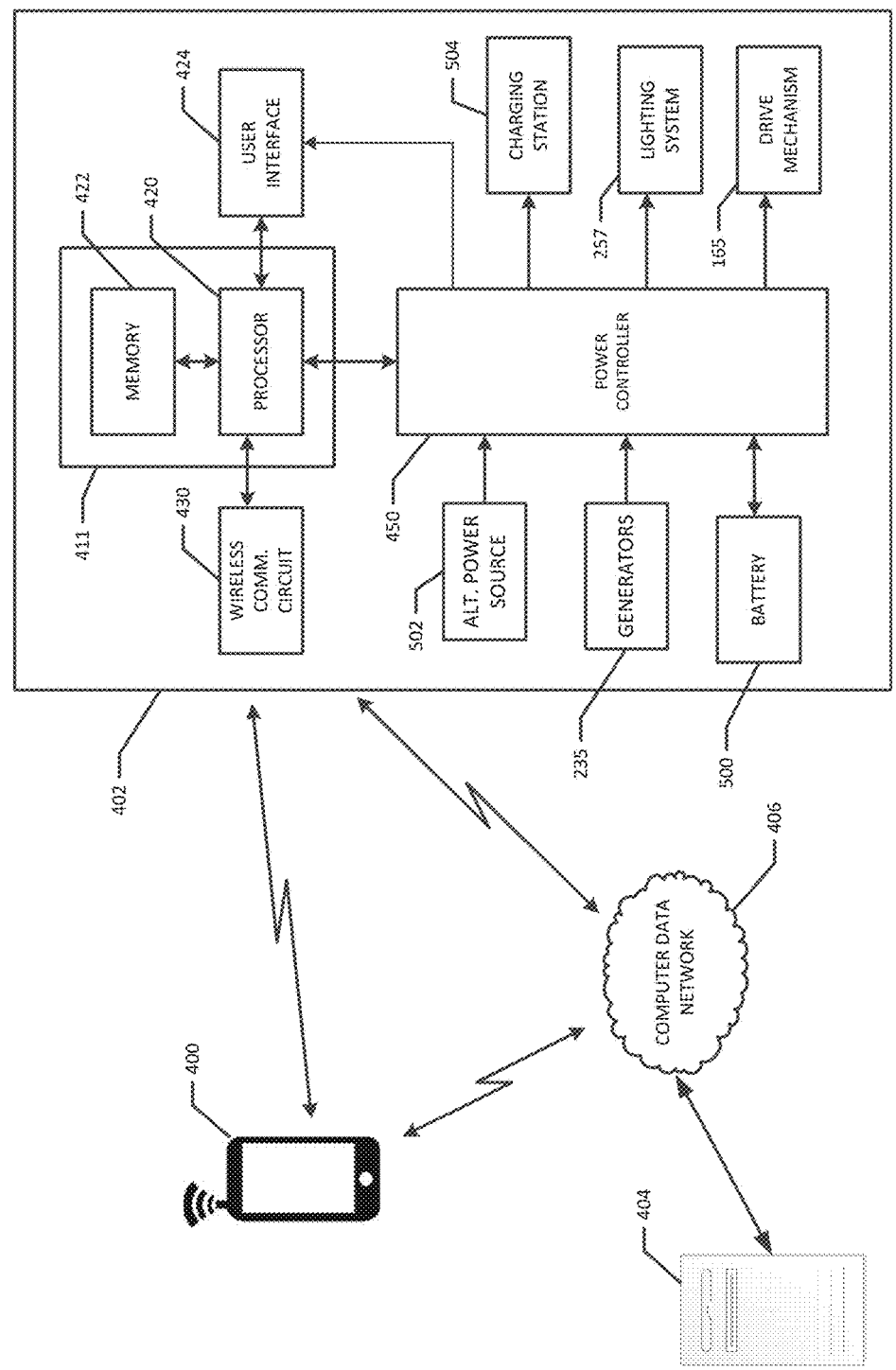
FIG. 9 is a block diagram of a system, that includes a wheeled juvenile product, according to various embodiments of the present invention.

As mentioned above, the stroller 1 or other wheeled juvenile product may be linked to a mobile computing device that executes a mobile app. FIG. 9 is a block diagram depicting the mobile computing device 400, a wheeled juvenile product 402 (e.g., the stroller 1 described above), and a remote server 404. Each of the mobile device 400, the wheeled juvenile product 402, and the remote server 404 may communicate via one or more computer data networks 406. The computer data networks(s) may comprise the Internet, WANs, LANs, MANs, etc.

Figure 10:
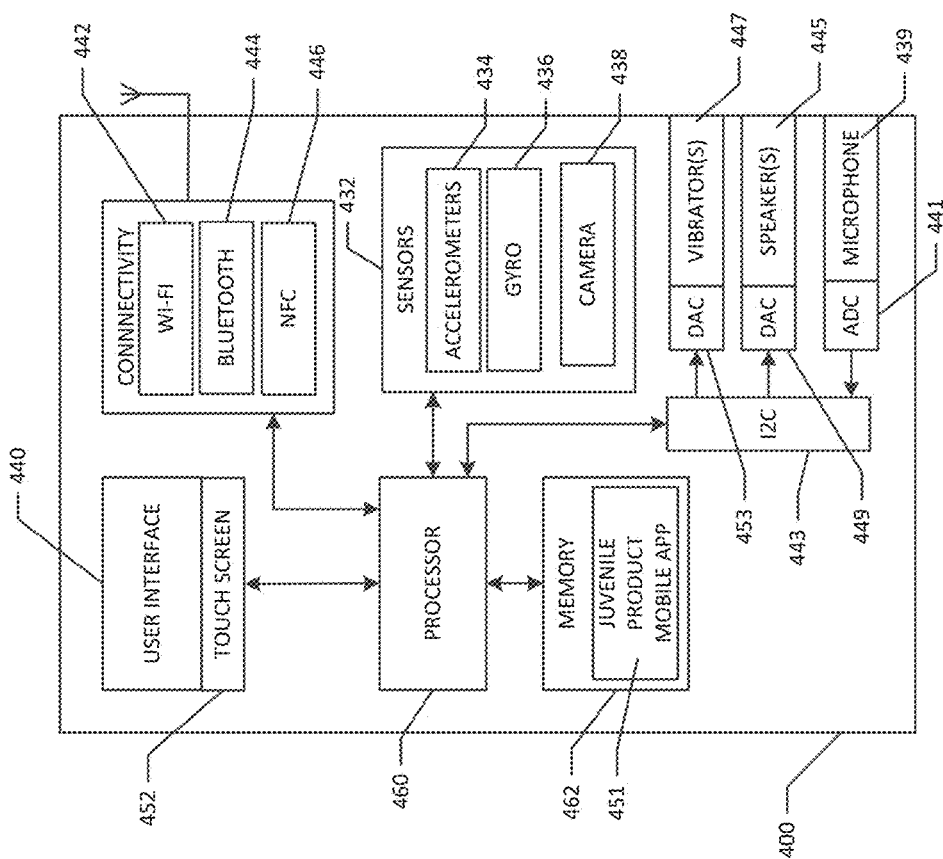
FIG. 10 is a block diagram of a mobile computing device of the system of FIG. 9 according to various embodiments of the present invention.

FIG. 10 is a block diagram of the mobile device 400. The mobile device 400 may be, for example, a smartphone, a tablet computer, a wearable computer, or any other suitable, mobile computing device that includes, as shown in FIG. 10, at least one processor 460 that is capable of downloading mobile apps from the server 404 via the network 406 for storage in memory 462 of the mobile device 400, and executing the downloaded apps. The mobile device 400, as shown in FIG. 10, also preferably comprises a user interface 440 through which the mobile device user can control and otherwise use the downloaded mobile app 451 for the wheeled juvenile product 402. The mobile device 400 also preferably includes wireless communication capabilities that allow it to communicate wirelessly with the juvenile product 402 and to connect wirelessly to the network 406. For example, the mobile device 400 may include a WiFi (IEEE 802.11x) communication circuit 442 that allows it to connect to the network 406 via an external wireless access point (WAP) and router. The mobile device 400 may also comprise circuitry for connecting to a cellular network that connects to the network 406. The WiFi communication circuit 442 could also establish an ad hoc WiFi connection with the juvenile product 402 (assuming the juvenile product was equipped with WiFi networking capability).

In addition or in lieu of the WiFi capabilities, the mobile device 400 may comprise other types of wireless communication capabilities. For example, the mobile device 400 may comprise Bluetooth and/or Near-field Communication (NFC) circuitry 444, 446 that allows the mobile device 400 to communicate wirelessly via Bluetooth or Near-field Communication (NFC) channels, as the case may be, with a paired device, such as the juvenile product 402. In addition or alternatively, the mobile device 400 could posses other types of wireless communication capabilities, such as ZigBee, Z-Wave, or Wireless USB, for example, that allow the mobile device 400 to communicate wirelessly with the juvenile product 402 and/or the network 406.

As shown in FIG. 10, the user interface 440 of the mobile device 400 may include a pressure-sensitive touch screen 452 that detects when a user of the mobile device 400 touches the touch screen 452 of the user interface 440. The mobile device 400 preferably also includes a sensor assembly 432, including an accelerometer system 434 and a gyroscope 436. The mobile device 400 may also include a camera 438, such as a CCD/CMOS camera. The mobile device 400 may also include controllers, codecs, and converters (e.g., analog-to-digital) that are not shown in FIG. 10 for the sake of simplicity and because they are well known and not necessary for a clear understanding of how the various embodiments of the present invention operate.

The mobile device's memory 462 may include internal Random Access Memory (RAM), Read Only Memory (ROM) and/or flash memory, as well as optional removable storage. The RAM may be, for example, LPDDR2 DRAM; the ROM may include one or more memory chips; the flash memory may include a SSD or emmc flash memory; and the optional removable storage may include a form of microSD card. One or more of these memory units may store the juvenile product mobile app 451, which is a software application that when executed by the processor 460 causes the processor 460 to communicate with and control the wheeled juvenile product 402. The mobile device 400 may also comprise a microphone 439 that is in communication with the processor 460. In that connection, the mobile device 400 may include an analog-to-digital converter (ADC) 441 to convert audio picked up by the microphone 439 to digital format for processing by the processor 460. The microphone 439 and the processor 460 may be in communication via an I2C data bus 443. The mobile device 400 may also comprise one or more audio speakers 445 and one or more vibrators (e.g., a small vibration motor) 447 for vibrating the mobile device 400, each having associated digital-to-analog converters 449, 453.

The juvenile product 402 may be any wheeled juvenile product that has electronic components, such as the lighting system 257, the control console 157, and the drive mechanism 165 descried above for the stroller 1. As shown in FIG. 9, the juvenile product 402 comprises a control circuit 411 that includes, among other things, one or more processors 420 and one or more memory units 422 for storing software that is executed by the processor 420 (which may be internal and/or external to the processor 420). The memory units 422 may include RAM, ROM and/or flash memory, as well as optional removable storage. The juvenile product 402 also comprises a user interface 424, such as the control console 157 shown in FIG. 8.

The juvenile product 402 may also comprise a wireless communication circuit 430 for communicating wirelessly with the mobile device 400 and/or the remote server 404. The wireless communication circuit 430 can include circuitry that communicates using one or more of the following wireless communication protocols: WiFi (IEEE 802.11x), Bluetooth, NFC, ZigBee, Z-Wave, Wireless USB, and/or cellular (e.g., 3G, 4G, etc.), or any other suitable wireless communication protocol. To that end, the computer data network 406 can comprise the Internet, WiFi networks, LANs, WANs, cellular telephone networks, etc. The mobile device 400 may connect to the computer data network 406 via a WiFi network or the mobile device's cellular network interface or any other suitable means. Similarly, a juvenile product 402 that is equipped with WiFi and/or a cellular network interface, for example, could connect to the computer data network 406.

Also as shown in FIG. 9, the juvenile product 402 includes a power controller 450. The power controller 450 can include a circuit that includes a number of power switches for switching electric power from one or more power sources to one or more output components. The power controller 450 can also include circuitry for monitoring the power loads and intelligently controlling the switches. The power sources can include the generator systems 235 on the juvenile product's wheels, as well as an alternative power source 502, which can be implemented as a DC power source, such as a non-rechargeable battery or a standby DC power supply, or an AC power adapter that converts AC power, such as from AC mains electricity, to DC power. The power sources can also comprise one or more rechargeable batteries 500 (referred to in the singular below). The rechargeable battery 500 can be charged, under the control of the power controller 450, by power from the generators 235 and/or the alternative power source 502. Additionally, the power controller 450 can supply power to other components of the juvenile product 402 that are electrically powered, such as the lighting system 257, the control console 157, and the drive mechanism 165, for example, or any other components of the juvenile product 402 that requires electric power. Additionally, the juvenile product 400 could comprise an additional load (or loads), such as a power resistor(s), for example, and the power controller 450 could switch some of the input power to such other loads. The load resistors could provide additional loading for the input sources, such as the generator 235, for example.

As also shown in FIG. 9, the juvenile product 402 may comprise a charging station 504 that can charge an external device, such as the mobile computing device 400. That is, for example, the charging station 504 may comprise one or more receptacles at which external devices with rechargeable batteries, such as the mobile device 400, could be plugged into to recharge the battery of the external device. For example, while a user of the mobile device 400 is pushing the wheeled juvenile product 402, such that its wheels rotate, the electric power from the generators 235 can be used to charge the mobile device 400 or other electronic devices with a rechargeable battery that are plugged into the charging station 504. The receptacles for the charging station 504 may be made available at the control console 157 of the juvenile product 402. In various embodiments, the charging station 504 could also comprise, additionally or alternatively, an inductive charging coil to charge external devices with inductive coupling. The juvenile product 402 could also comprise a data port, such as USB port, for a wired connection to the mobile device 400. The data port may be located at the control console 157, for example.

Figure 11:
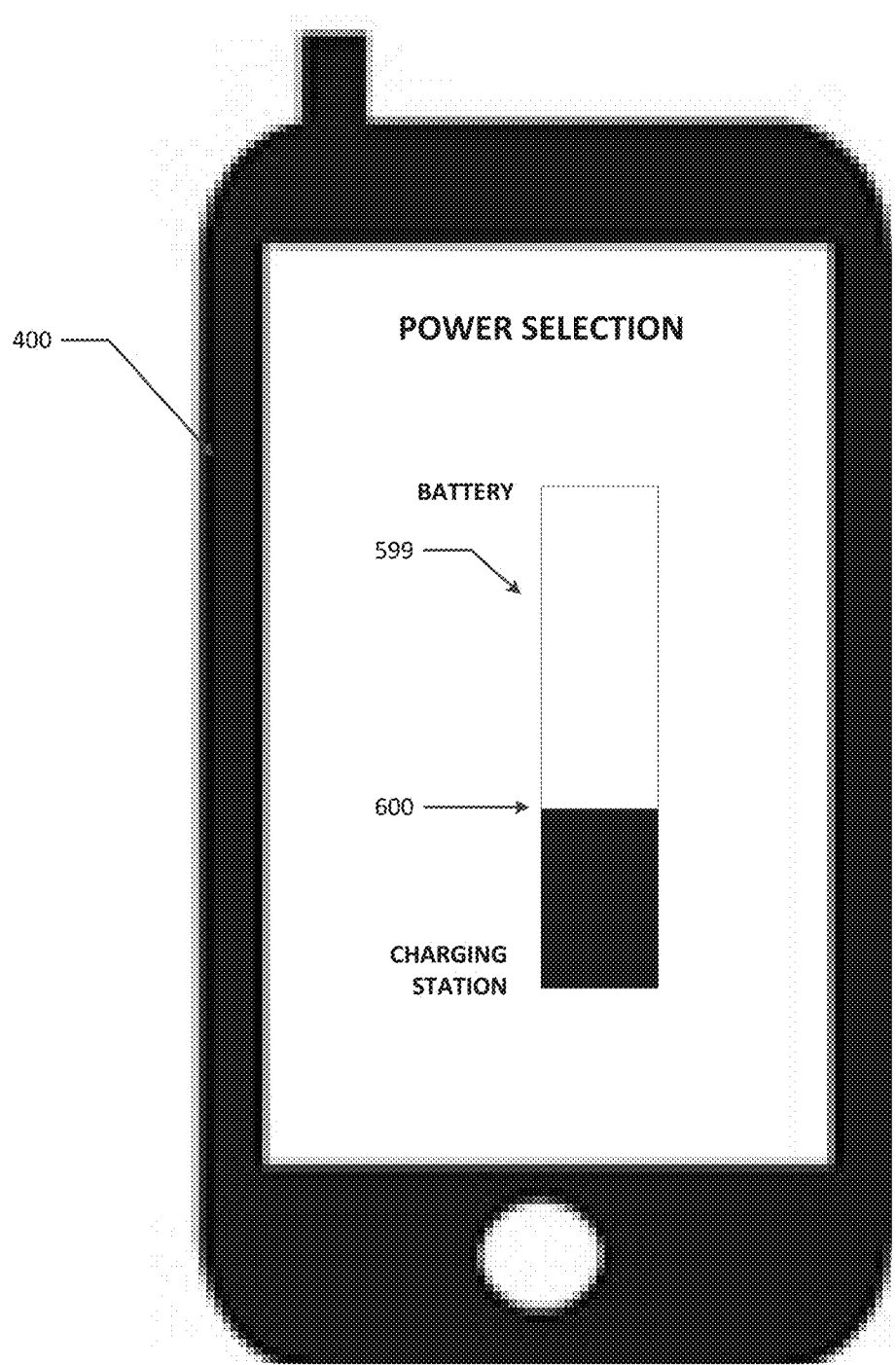
FIG. 11 is a diagram of a user interface provided by a mobile application on the mobile computing device of FIG. 10 according to various embodiments of the present invention.

In various embodiments, a user of the mobile device 400, while pushing the stroller 402 and generating power, could control, by using the mobile app 451, how much power the power controller 450 diverts from the generators 235 (and the alternative power source 502 if applicable) to the charging station 504 versus the battery 500. For example, for or on a trip with the stroller 402, the user of the mobile device 400 can open the app 451 and select from its menu to control the power distribution of the wheel-generated power. FIG. 11 is an example of the app's power selection page that may display on a touchscreen interface 440 on the mobile device 400. The illustrated display includes an interactive bar 599 that allows the mobile device user to allocate how much power during the trip is allocated to the battery 500 versus the charging station 504. In the illustrated example, if the mobile device user drags the indicator 600 all the way to the top of the interactive bar 599, 100% of the generated power will go to the battery and 0% of the power will go to the charging station. Conversely, if the mobile device user drags the indicator 600 all the way to the bottom, 0% of the generated power will go to the battery and 100% of the power will go to the charging station. As illustrated in FIG. 11, about 40% goes to the charging station and 60% goes to the battery.

When the mobile device user enters the power selection mode of the app 451 and selects the desired distribution, the mobile device 400 (executing the app 451) can transmit to the control circuit 411 of the juvenile product 12 data indicative of the mobile device user's power distribution selection (e.g., X % to the battery and Y % to the charging station), which may be stored in the juvenile product's memory 422. The control circuit 411, through the processor 420 executing software in the memory 422, may then command the power controller 450 to distribute X % of the power from the generators 235 to the battery and Y % to the charging station in accordance with the user's power distribution selection. The power controller 450 makes the distribution by appropriate controlling its internal power switches. The mobile device user could change the power distribution selection at any point during a trip with the juvenile product 402, and the updated power distribution selection can be transmitted to the juvenile product 402 in real-time for implementation.

The example of FIG. 11 is one example of a user interface that could be provided by the mobile app 451 that allows the mobile device user to set the desired power distribution allocation. In other embodiments, the app 451 could use other user-interface techniques to allow the user to select the power distribution allocation. For example, the user could type in percentage numbers for the allocations between the battery and charging station; the user could select distribution allocations from a drop-down menu or dial; the slider bar 599 could be horizontal instead of vertical; etc. Also, the allocation selection means can be continuous (as in the example of FIG. 11) or in discrete steps (e.g., 100/0, 90/10, 80/20 . . . 20/80, 10/90, 0/100). Still further, the app could be stored in the memory 422 of the juvenile product 400 and run on the processor 420 of the juvenile product 400, and the user could input their power distribution selection via the integrated user interface 424. As such, the user interface 424 may be similar in capability to the user interface 440 of the mobile device 400 in terms of receiving and recognizing user inputs.

In various embodiments, the wheeled juvenile product 402 may also include various on-board sensors that are in communication with the juvenile product's control circuit 411 and processor 420. For example, the juvenile product 402 may include an internal clock, an odometer on one of the wheels that measures distance by counting the wheel rotations, and/or a speedometer that measures the time between each wheel revolution. The outputs of these sensors can be displayed on the juvenile product's user interface 424. The internal clock can be part of the processor 420 or other microcontroller of the control circuit 411, and driven by an oscillator, for example.

To that end, the juvenile product 402 can store data from a trip involving the juvenile product 402 in its memory 422. The data can include, for example, the date and the time of the trip, the duration of the trip (both based on the clock), and the distance of the trip (based on the odometer), among other things. The stored data can also include computations, such as estimated calories on the trip. For example, a user could input their weight via the app 451 or the user interface 424, which could be stored in the memory 422. Based on the user's weight, the distance and the duration of the trip, the processor (e.g., processor 460 of the mobile device 400 or processor 420 of the stroller 402) can compute an estimate of the calories burned on a trip. If the stroller 402 includes an elevation gain or grade sensor, that data can be used in the computation of the calorie estimate as well. The stroller 402 can transmit the trip data to the mobile device/app as described below, and the app 451 may comprise a menu item where the user can view the logs of recorded trips. The log data for each trip can show, for example, to the extent available: the date and time of the trip, its duration, its distance, the temperature, the accumulated elevation gain, and the estimated calorie burn.

Figure 12A:
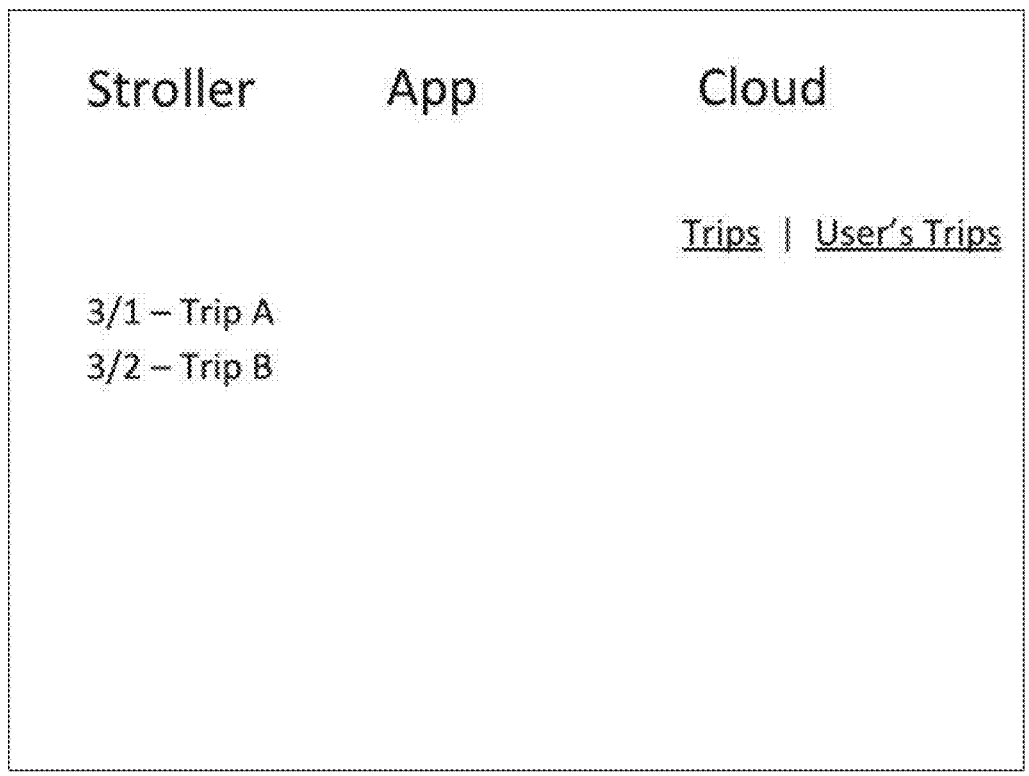

In various embodiments, the trip logs stored in the stroller's memory 422 can be uploaded to the user's mobile device/app and/or the remote server 404, so that the user can access the trip logs, at least for the trips associated with the user's account for the mobile app. FIGS. 12A through 12L illustrate how the usage logs are uploaded from the juvenile product 12 according to an example of the present invention. Referring to FIG. 12A, assume a user, Jane, purchases a stroller on March 1 (3/1). In this example, at this point the juvenile product/stroller has already recorded in its memory 22 data for two trips, denoted Trips A and B in FIG. 12A.

Figure 12B:
Figure 12C:
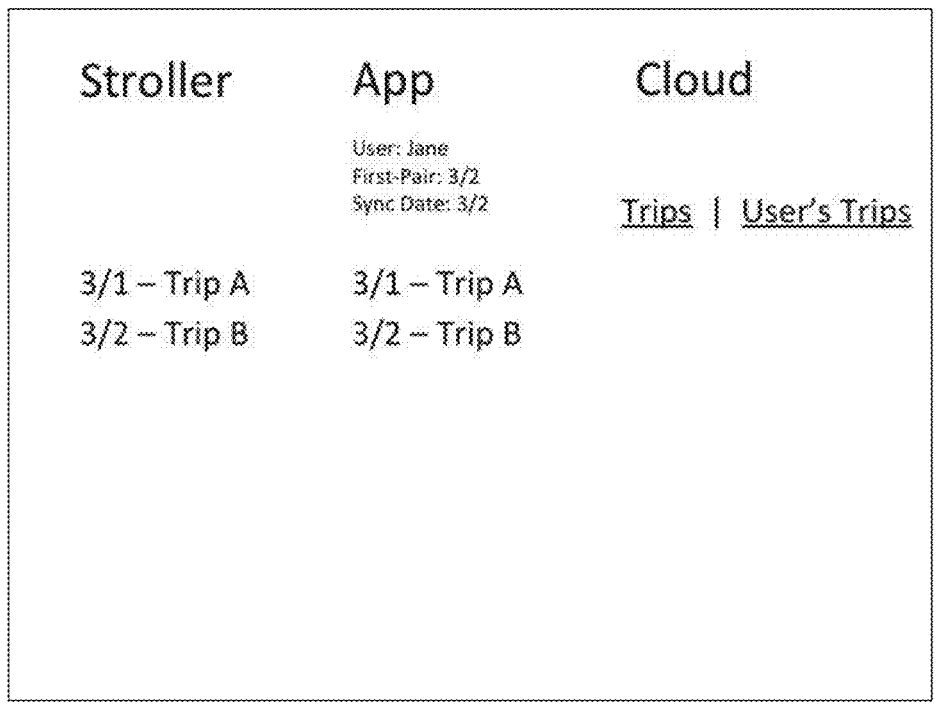
Figure 12D:
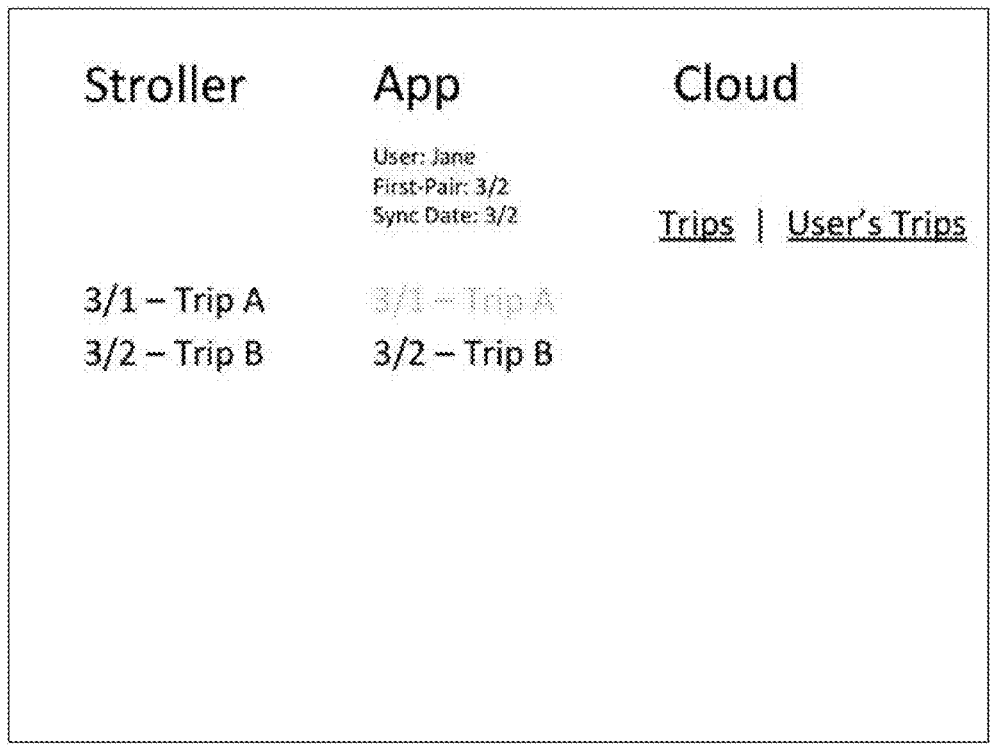

As shown in FIG. 12B, Jane pairs (e.g., establishes a connection between) her mobile device app 4 with the stroller 402 on March 2 (3/2), using her user account for the app 451. The stroller 402 in response transmits its stored usage log data to the app 451; in other words, the stroller 402 and app 451 synchronize their data. As shown in FIG. 12C, the app 451 records two dates at this point: Jane's date of most-recent pairing (in this case, her initial pairing on March 2 (3/2)), as well as the date of last synchronization of her user device 400 with the stroller 402, initialized in this example to the date of first-pairing, namely March 2. By synchronizing with the stroller 402, Jane's application 451 retrieves the usage log data already existent on the stroller's memory 422. As shown in FIG. 12D, because Jane's date of first-pairing is March 2, and trip A happened prior to March 2, Jane does not see the data for Trip A on her user device/app 4 (indicated in FIG. 12D by the faded-out, grey color for Trip A). It should be noted that the first-pairing and last-sync dates preferably have more resolution than dates; they can be recorded down to the second or even fraction of a second. Similarly, the trips dates can have more resolution than dates; they too can be recorded down to the second or even fraction of a second. That way, it can be known if a trip occurred before or after a synchronization event even if they occurred on the same day.

Figure 12E:
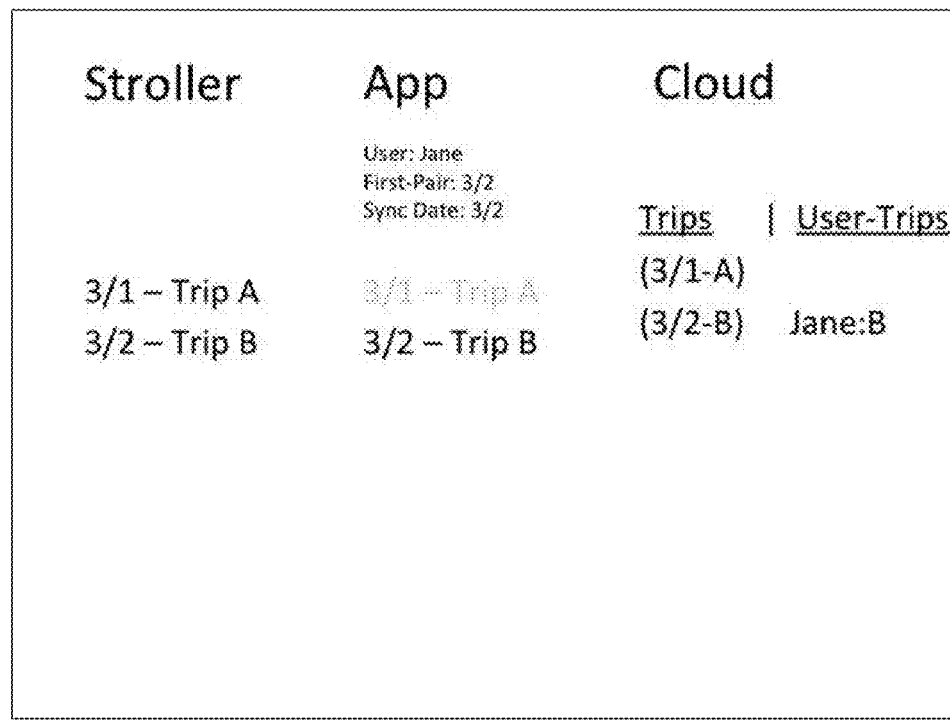

As shown in FIGS. 12E and 12F, the usage log data for Trips A and B are transmitted to the remote server 404 (indicated by "Cloud" in FIGS. 12A-L), either by the mobile app 451 or the stroller 402. The remote server 404 stores data associating Jane with Trip B, since Jane paired her app/device with the stroller 402 prior to Trip B, to show that it happened during her ownership of the stroller 402. If Jane takes two more trips, Trips C and D on March 3 and 4 respectively, but does not sync until after Trip D, the next time her user device 400 is paired with the stroller, she receives the data for the new Trips C and D on the application 451, and the data for Trips C and D is transmitted to the central server 404, which stores data associating Trips C and D with Jane's account, as shown in FIG. 12F.

Figure 12G:
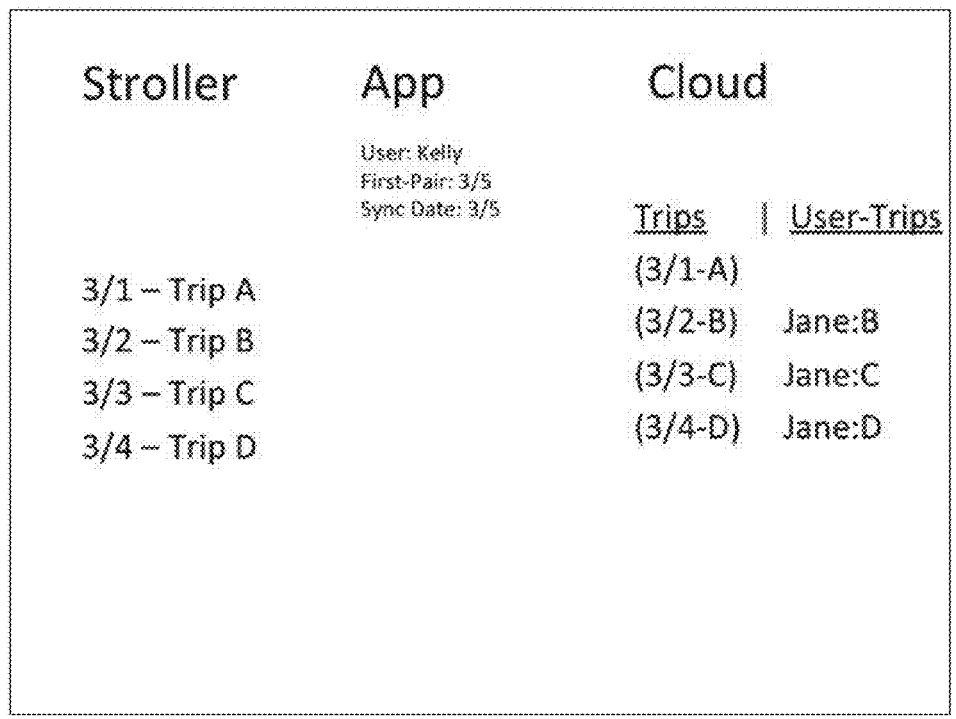

As shown in FIGS. 12F and 12G, there can be a difference in the processes for restoring data for a user and recording new data. If Jane were to lose her user device 400, or to log out on her session, all of Jane's trip data could be restored from the remote server 404 in such circumstances by running a query on the User-Trips table of the remote server 404 for a record of Jane's claimed trips (Trips B, C, and D in this example), and sending to her user device 400 from the remote server 404 the relevant trip information.

New trip data comes from the stroller 402, either directly or indirectly, in various embodiments. For example, assume Jane sells the stroller 402 to Kelly, and Kelly first pairs and synchronizes her mobile device/app with the stroller 402 on March 5, under her user ID for the app 451. In that case, in various embodiments, Kelly's app will not show any trips, as indicated by FIG. 12G, since there are no recorded trips for the stroller 402 that occurred after Kelly's first pairing. As such, when Kelly requests data from the stroller from the remote server 404, she does not receive data for Trips A, B, C, or D, because those trips are associated with Jane and fall before Kelly's date of first pairing. But if a new trip occurs after Kelly's first pairing, such as Trip E shown in FIG. 12H, the remote server 404 will store data associating that trip with Kelly and not Jane. Accordingly, the above-described method of associating trips with users provides security to both Jane and Kelly. As shown in FIG. 12H, if Jane were to lose and restore her user device, she only sees data for Trips B, C, and D since the remote server 404 only associates those trips with Jane. Jane does not receive from the remote server data for Trip E because to retrieve that she would need to pair her user device 400 with the stroller 402 again. Also, Kelly cannot see Jane's trips because they occurred prior to her date of first-pairing.

In one implementation, multiple users can use the stroller at the same time and track their respective distances traveled and other related parameters relative to their own body metrics. For example, referring to FIG. 12I, in an example scenario Kelly is married to Larry, and when Kelly purchases the stroller they each pair their respective user device 400 (or respective account within the application 451 on the same user device 400) with the stroller 402. Additional trips are added for when Kelly has been subsequently syncing her user device 400 with the stroller (e.g., syncing after the first pairing on March 5 so that her account has all related trips (Trips E, F and G, occurring after Kelly's first-pairing on March 5), as shown in FIG. 12J.

The stroller's collection and storage of user log data may be user-agnostic. Accordingly, in such embodiments, when multiple users use the stroller 402, they will have to specify which trips belong to which user. FIGS. 12K and 12 L provide an example. In this example, as shown in FIG. 12K, Kelly first paired with the stroller on March 5 and Larry first paired with it on March 6. As such, the app will show Trips E, F and G for Kelly since they occurred after Kelly's first pairing. On the other hand, only Trips F and G in the illustrated example are shown for Larry since Trip E occurred before Larry's first-pairing. The data stored by the remote server 404 associates Trip E with Kelly, and Trips F and G are associated with both Kelly and Larry until otherwise instructed by Kelly or Larry. At this point, if Larry were to query the remote server 404 under his user ID, he would only receive the data for Trips F and G; the data for Trip E would not be transmitted to Larry's mobile device since it occurred prior to Larry's first-pairing and, for that reason, is not associated with Larry by the remote server 404.

Now assume that Larry did not take Trip G; instead Trip G was Kelly's trip alone. In such circumstances, in various embodiments, the app 451 permits Larry to remove Trip G from his personal trip list and instead mark it as belonging to the stroller, user-agnostically. The trip, still occurring in Larry's first-pair and last-sync window, remains on the remote server 404 and on Kelly's app, but the association between Larry and Trip G is removed from the central server 404, as shown in FIG. 12L. This functionality, while requiring user input, is beneficial to the user in that they get to see what is going on with the stroller while they are not using the stroller themselves. So if Kelly and Larry have a nanny and they want to see how long the nanny took the baby out on the stroller, Kelly and Larry can see those trips whenever they sync their respective user devices 400 with the stroller.

Having two separate accounts also enables calculating calorie burn using separate body metrics. When the application receives the data for Trip F, the application can use Larry's body metrics (e.g., weight) to calculate the number of calories he burned on the trip, yet when Kelly's application receives the data for the Trip F, her application uses her body metrics to obtain her estimated calorie burn.

FIG. 13 is a flow chart illustrating an example of the above-described process. The example illustrated in FIG. 13 assumes that two users, User 1 and User 2, each use the same stroller 402 and each have their own mobile app 451 for communicating with the stroller 402. As indicated at step 601, at time T0, User 1 pairs with the stroller 402 for the first time. To pair with the stroller 402, the User 1 downloads the app 451 to their user device 400, creates a user account for the app 451, and links that user account to the stroller 402, such as by entering an ID (barcode) for the stroller 402. Subsequently, at time T1 (and as indicated at step 602), the User 1 syncs his/her app 451 with the stroller 402. A user of the app 451 (e.g., User 1) can sync their app with the stroller by activating a data synchronization button or icon on the app's display to initiate a synchronization of data from stroller 402 to the app 451. Accordingly, at step 603, the stroller 402 transmits data about its recorded trips for the time period T0 to T1 (stored in the stroller's memory 422) to User 1's mobile device/app via their wired or wireless data link, as the case may be. Then, in various embodiments, as indicated by step 604 in FIG. 13, User 1's app 451 uploads the usage log data to the remote server 404. User 1's can also transmit to the remote server 404 the time stamps for User's first pairing (step 601) and last sync (step 602) with the stroller 402 so that, at step 605, the remote server 404 can associate the trip data for the time period T0 to T1 with User 1, since they occurred between User 1's first pairing (step 601) and last sync (step 602). In other embodiments, alternatively or additionally, the stroller 402 could upload the trip log data directly to the remote server 404, along with the first-pairing and last-sync time stamps. If necessary, User 1 could access the trip data on the remote server 404 associated with their user account from the mobile app 451 or with any computer device that connects to the remote server 404 via the network 406.

Subsequently, at time T2 and as indicated by step 606, User 2 pairs with the stroller 402 for the first time. Subsequently, at time T3 (and as indicated at step 607), the User 2 syncs his/her app 451 with the stroller 402. Accordingly, at step 608, the stroller 402 transmits data about its recorded trips for the time period T2 to T3 (stored in the stroller's memory 422) to User 2's mobile device/app via their wired or wireless data link, as the case may be. Then, in various embodiments, as indicated by step 609 in FIG. 13, User 2's app 451 uploads the usage log data to the remote server 404, along with the time stamps for User's first pairing (step 601) and last sync (step 602) so that, at step 610, the remote server 404 can associate the trip data for the time period T2 to T3 with User 2, since they occurred between User 2's first pairing (step 606) and last sync (step 607). Similarly, in other embodiments, alternatively or additionally, the stroller 402 could upload the trip log data directly to the remote server 404, along with the first-pairing and last-sync time stamps.

If User 1 never synced to the stroller again after time T3, User 1's app would never show the trip logs for User 2's trips between time T2 and T3, although the remote server 404 continues to associate the trips between times T0 and T1 with User 1. This functionality is described above in connection with FIGS. 12G to 12H, where Kelly's trips (User 2) were not shown to Jane (User 1), although the remote server 404 continued to associate Trips B, C and D with Jane. If User 1 syncs up again, however, as indicated by step 611 in FIG. 13, at time T4, then at step 612 the stroller 402 can transmit its stored trip log data from User 1's first pair-last sync time window, the time period T0 to T4 in this example, to User 1's app and, at step 613, User 1's app can transmit the trip data to the remote server 404, so that, at step 614, the remote server 404 can associate the trip data for the time period T0 to T4 with User 1, since they occurred between User 1's first pairing (step 601) and last sync (step 611). Note that in this example, the trips between times T2 and T3 are associated with both User 1 and User 2, similar to the example with Kelly and Larry in FIG. 12K. User 1 and User 2 could then, optionally, allocate trips between times T2 and T3 between User 1 and User 2, such as described above in connection with FIG. 12 L.

In another embodiment, the uploaded trip data from the juvenile product 400 could include trip data for days outside of the first pair-last sync time window, in particular a buffer of N days appended after the last sync data. The buffer could be N=5 days or so. For example, if the user's first pair date was March 1 and the user's last sync date was April 1, their first pair—last sync time window is March 1 to April 1. But in an embodiment with the N-day buffer, the user could get N additional days of trip data. For example, if N=5 days in the above example (where the first pair— last sync time window is March 1 was April 1), the user could see trip data from March 1 to April 1 plus 5 days, so March 1 to April 6, by logging into their app. As such, if the user's last sync was April 1 but logged into the app on April 3, the user would see the trip data through April 3 since it is within the additional day buffer. That way, for example, if the user's spouse took a trip with juvenile product on April 2, the user would be able to see that trip data by logging into the app 451 on some time after April 2, in such an embodiment.

In one general example, Example 1, therefore, the present invention is directed to a system that comprises a juvenile product 402 (such as a stroller) and a mobile computing device 400. The juvenile product comprises, among other things: a device 235 for generating electric power from motion of the juvenile product; a power storage device, such as the rechargeable battery 500; an electrical load (e.g., the lighting system 257, the control console 157, the drive mechanism 165 and/or a power resistor) that is powered by the rechargeable battery; a charging station 504 for charging external electronic devices coupled to the charging station (such as the mobile computing device 400 itself); and a power control circuit 450. The mobile computing device 400 is in communication with the juvenile product 402 and comprises, and executes, a mobile application 451 that is linked to the juvenile product 402, such as through a user account. The mobile computing device receives, from a user via the mobile application 451, and transmits to the juvenile product 402, a power distribution selection that indicates the user's preference for distributing power generated by the generator 235 to the rechargeable battery 500 and the charging station 504. In response to receiving the power distribution selection from the mobile computing device 400 by the juvenile product 402, the power control circuit 450 distributes power generated by the generator 235 to the rechargeable battery 500 and the charging station 504 in accordance with the received power distribution selection.

In another example, Example 2, the present invention is directed to a juvenile product 402 that comprises: a device 235 for generating electric power from motion of the juvenile product; a rechargeable battery 500; an electrical load powered by the rechargeable battery; and a charging station 504 for charging external electronic devices coupled to the charging station. The juvenile product 400 also comprises means for distributing power generated by the generator 235 to the rechargeable battery 500 and the charging station 504 in accordance with a power distribution selection of a user that indicates the user's preference for distributing power generated by the generator 235 to the rechargeable battery 500 and the charging station 504.

In another example, Example 3, of Examples 1 and 2 above, the mobile computing device 400 communicates with the juvenile product 402 via a wireless or wired communication link. In another example, Example 4, of Examples 1 or 4 above, the mobile computing device 400 can comprise a touchscreen 440, and the mobile computing device 400 receives the power distribution selection from the user via the touchscreen when the mobile computing device 400 is executing the mobile application 451. In another example, Example 5, of Examples 1 through 4 above, the juvenile product comprises a wheel 59, 61, and the generator device 235 generates the electric power from rotation of the wheel 69, 61. In another example, Example 6, of Examples 1 through 6 above, the juvenile product comprises a stroller. In another example, Example 7, of Examples 1 through 6 above, the juvenile product comprises (i) a memory device 422 for recording data about trips taken by the juvenile product and (ii) a communication circuit 430 for transmitting updated, user-specific trip data to the mobile computing device. In another example, Example 8, of Examples 1 through 7 above, the system further comprises a remote server 404 that communicates with the mobile computing device 400 via a computer data network 406, and the mobile computing device 400 transmits the updated, user-specific trip data to the remote server 404.

In another example, Example 9, of Examples 2 through 8, the means for distributing power comprise: a control circuit 411 for receiving, from a mobile application 451 executing on a remote mobile computing device 400, the power distribution selection of the user; and a power controller 450 in communication with the control circuit 411. The power controller 450 distributes the power generated by the generator 235 to the rechargeable battery 500 and the charging station 504 in accordance with the received power distribution selection.

In another general example, Example 10, the present invention is directed to a system that comprises a wheeled juvenile product 402 and a mobile computing device 400. The wheeled juvenile product comprises an internal clock, a distance sensor (e.g., odometer) for measuring a distance traveled by the juvenile product, and a memory 422 for recording data about trips taken by the juvenile product. The data for each recorded trip can comprise a date of the trip, a time duration of the trip, and a distance of the trip. The mobile computing device 400 is in communication with the juvenile product 402 and comprises—and executes—a mobile application 451 for communicating with the juvenile product 402. The mobile application 451 has a user account for a user of the mobile application 451. The mobile computing device 400 is for receiving from the juvenile product 402, and the juvenile product 402 is for transmitting to the mobile computing device 400, recorded trip data for trips during a time period from (a) a first time the mobile application was paired with the juvenile product under the user account to (b) a last time the user, under the user account, requested, via the mobile application, to synchronize recorded trip data.

In another example, Example 11, of Example 10, the juvenile product 402 further comprises a wheel, and the distance sensor comprises an odometer that senses distance traveled based on revolutions of the wheel. In another example, Example 12, of Examples 10 or 11, the juvenile product 402 can comprise: a generator 235 for generating electric power from rotation of the wheel; a rechargeable battery 500; one or more electrical loads that are powered by the rechargeable battery; a charging station 504 for charging external electronic devices coupled to the charging station; and a power control circuit 450. In another example, Example 13, of Example 12, the mobile computing device 400 is for receiving, from a user via the mobile application 451, and transmitting to the juvenile products 402, a power distribution selection that indicates the user's preference for distributing power generated by the generator 235 to the rechargeable battery 500 and the charging station 504. In response to receiving the power distribution selection from the mobile computing device 400 by the juvenile product 402, the power control circuit 450 distributes power generated by the generator 235 to the rechargeable battery 500 and the charging station 504 in accordance with the received power distribution selection. In another example, Example 14, of Examples 1 through 13, the system may further comprise a remote server 404 that is in communication with the mobile computing device 400 via a computer data network 406. The mobile computing device 400 transmits to the remote server 404, and the remote server 404 stores, the recorded trip data for trips during the time period from (a) the first time the mobile application was paired with the juvenile product 402 under the user account to (b) the last time the user, under the user account, requested, via the mobile application, to synchronize the recorded trip data from the juvenile product 402. Further, the storage of the recorded trip data by remote server 404 associates the user with the recorded trip data.

In another example, Example 15, the present invention is directed to a juvenile product that comprises: a device 235 for generating electric power from motion of the juvenile product; a power storage device, such as the rechargeable battery 500; an electrical load powered by the power storage device; a charging station 504 for charging external electronic devices; an integrated user interface 424 that receives a user's preference for distributing generated power; and a power control circuit 450 that distributes generated power to the power storage device and/or the charging station in accordance with the received power distribution selection.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes," or "contains" one or more elements possesses those one or more elements, but is not limited to possessing only those one or more elements. Likewise, an element of a system, device, or apparatus that "comprises," "has," "includes," or "contains" one or more elements possesses those one or more elements, but is not limited to possessing only those one or more elements.

Some aspects of the present disclosure may be described using the expression "coupled" along with its derivatives. In an example, some aspects may be described using the term "coupled" to indicate that two or more elements are in direct physical or electrical contact. The term "coupled," however, also may mean that two or more elements are not in direct contact with each other, but yet still co-operate or interact with each other.

As used herein, an electrical or electronic circuit may refer to a composition of individual electronic components, such as resistors, transistors, capacitors, inductors and diodes, connected by conductive wires or traces through which electric current can flow. Further, as used herein, circuits or circuit devices may refer to, but are not limited to, electrical circuitry having one or more discrete electrical components, integrated circuits, and/or application specific integrated circuits (ASICs), etc. or configuration thereof to perform the indicated function. he software for the computer and processor-based devices described herein may be stored on any type of suitable computer-readable medium or media, such as, for example, a magnetic or optical storage medium, and in any suitable type of storage device, such as, for example, a computer system (nonvolatile) memory, an optical disk, magnetic tape, HDD, or SSD. Furthermore, at least some of the processes may be programmed when the computer system is manufactured or stored on various types of computer-readable media.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

Any patent, publication, or other disclosure material, in whole or in part, that is said to be incorporated by reference herein is incorporated herein only to the extent that the incorporated materials do not conflict with existing definitions, statements, or other disclosure material set forth in the disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Although the various embodiments of the devices have been described herein in connection with certain disclosed embodiments, many modifications and variations to those embodiments may be implemented. Also, where materials are disclosed for certain components, in certain instances, other materials may be used. Furthermore, according to various embodiments, a single component may be replaced by multiple components, and multiple components may be replaced by a single component, to perform a given function or functions. In addition, features disclosed in connection with one embodiment may be employed with other embodiments disclosed herein. The foregoing description and following claims are intended to cover all such modification and variations.

What is claimed is:

1. A system comprising:
   a juvenile product comprising:
      a device for generating electric power from motion of the juvenile product;
      a power storage device
      an electrical load powered by the power storage device;
      a charging station for charging external electronic devices, wherein the external electronic devices are devices that are not permanently integrated into the juvenile product; and
      a power control circuit; and
   a mobile computing device that communicates with the juvenile product, wherein:
      the mobile computing device receives a user's preference for distributing generated power and transmits this power distribution selection to the juvenile product; and
      the juvenile product's power control circuit distributes generated power to the power storage device and/or the charging station in accordance with the received power distribution selection.

2. The system of claim 1, wherein the mobile computing device communicates with the juvenile product via a wireless communication link.

3. The system of claim 1, wherein:
   the juvenile product comprises a wheel; and
   the device for generating electric power generates the electric power from rotation of a wheel.

4. The system of claim 3, wherein the juvenile product comprises a stroller.

5. The system of claim 4, wherein the electrical load comprises a lighting system of the stroller.

6. The system of claim 4, wherein the electrical load comprises a power resistor.

7. The system of claim 1, wherein the charging station is for charging the mobile computing device.

8. The system of claim 1, wherein:
   the mobile computing device comprises a touchscreen; and
   the mobile computing device receives the user's power distribution selection via the touchscreen.

9. The system of claim 1, wherein the juvenile product comprises:
   a memory device for recording data about trips taken by the juvenile product; and
   a communication circuit for transmitting updated, user-specific trip data to the mobile computing device.

10. The system of claim 9, further comprising a remote server that communicates with the mobile computing device via a computer data network, wherein the mobile computing device transmits the updated, user-specific trip data to the remote server.

11. The system of claim 1, wherein:
    the mobile computing device communicates with the juvenile product via a wireless communication link;
    the juvenile product comprises a stroller that comprises a wheel;
    the device for generating electric power generates the electric power from rotation of the wheel of the stroller;
    the mobile computing device comprises a touchscreen; and
    the mobile computing device receives the user's power distribution selection via the touchscreen.

12. The system of claim 1, wherein the power storage device comprises a rechargeable battery.

13. A juvenile product comprising:
    a device for generating electric power from the motion of the juvenile product;
    a power storage device;
    one or more electrical loads that are powered by the power storage device;
    a charging station for charging external electronic devices coupled to the charging station, wherein the external devices are not permanently integrated into the juvenile product; and
    means for distributing generated power to the power storage device and the charging station in accordance with a user's preference for distributing generated power to the power storage device and/or the charging station.

14. The juvenile product of claim 13, wherein the means for distributing power comprise:
    a control circuit for receiving, from a remote mobile computing device, the user's power distribution selection; and
    a power controller in communication with the control circuit, wherein the power controller distributes the power generated by the generator to the power storage device and/or the charging station in accordance with the user's power distribution selection.

15. The juvenile product of claim 13, wherein the charging station is for charging the mobile computing device.

16. The juvenile product of claim 13, wherein the juvenile product comprises a stroller.

17. The juvenile product of claim 13, further comprising:
    a memory device for recording data about trips taken by the juvenile product; and
    a communication circuit for transmitting updated, user-specific trip data to the mobile computing device.

18. A system comprising: a juvenile product that comprises: a generator for generating electric power from motion of the juvenile product; a power storage device; an electrical load powered by the power storage device; a charging station for charging external electronic devices, wherein the external electronic devices are devices that are not permanently integrated into the juvenile product; a power control circuit; an internal clock; a sensor for measuring a distance traveled by the juvenile product; and a memory for recording data about trips taken by the juvenile product; and a mobile computing device that communicates with the juvenile product, wherein: the juvenile product transmits updated, user-specific trip data to the mobile computing device; the mobile computing device receives a user's preference for distributing generated power and transmits this power distribution selection to the juvenile product; and the juvenile product's power control circuit distributes generated power to the power storage device and/or the charging station in accordance with the received power distribution selection.

19. The system of claim 18, further comprising a remote server that communicates with the mobile computing device via a computer data network, wherein the mobile computing device transmits the updated, user-specific trip data to the remote server.

20. The system of claim 18, wherein the updated, user-specific trip data comprises trip data for trips during a time period from (a) a first time the mobile computing device was paired with the juvenile product under a user account for the user, to (b) a last time the user, under the user account, requested, via the mobile computing, to synchronize recorded trip data.

21. The system of claim 18, further comprising a remote server that communicates with the mobile computing device via a computer data network, wherein the mobile computing device transmits the updated, user-specific trip data to the remote server.

22. A juvenile product comprising:
a device for generating electric power from motion of the juvenile product;
a power storage device;
an electrical load powered by the power storage device;
a charging station for charging external electronic devices, wherein the external electronic devices are devices that are not permanently integrated into the juvenile product;
an integrated user interface that receives a user's preference for distributing generated power; and
a power control circuit that distributes generated power to the power storage device and/or the charging station in accordance with the received power distribution selection.

* * * * *